United States Patent
Kishima et al.

[11] Patent Number: 6,074,039
[45] Date of Patent: Jun. 13, 2000

[54] PRINTING DEVICE

[75] Inventors: Koichiro Kishima; Takaaki Murakami, both of Kanagawa; Takashi Katoku, Tokyo, all of Japan

[73] Assignee: Sony Corporation, Tokyo, Japan

[21] Appl. No.: 08/831,827

[22] Filed: Apr. 2, 1997

[30] Foreign Application Priority Data

| Apr. 5, 1996 | [JP] | Japan | 8-084352 |
| Apr. 24, 1996 | [JP] | Japan | 8-102423 |
| May 28, 1996 | [JP] | Japan | 8-133670 |

[51] Int. Cl.[7] .................... B41J 2/14
[52] U.S. Cl. .................... 347/45; 347/47
[58] Field of Search .................... 347/45, 47

[56] References Cited

U.S. PATENT DOCUMENTS

| 4,567,493 | 1/1986 | Ikeda et al. | 347/45 |
| 5,312,517 | 5/1994 | Ouki | 156/643 |
| 5,811,019 | 9/1998 | Nakayama et al. | 216/27 |

FOREIGN PATENT DOCUMENTS

| 0 471 157 A1 | 2/1992 | European Pat. Off. |
| 0 576 007 A2 | 12/1993 | European Pat. Off. |
| 62-456971 | 7/1987 | Japan |
| 5-147214 | of 1993 | Japan |

OTHER PUBLICATIONS

Japanese Patent Abstract—JP 6328698 A (Canon Inc.), Nov. 29, 1994.

Primary Examiner—N. Le
Assistant Examiner—Christina Annick
Attorney, Agent, or Firm—Hill & Simpson

[57] ABSTRACT

The present invention provides a printing device capable of high-resolution reproduction of documentary images and ensuring satisfactory productivity. Specifically, the invention provides a printing device which ejects only ink or a printing device which mixes/ejects ink and diluent, both of which has at least the periphery of the nozzle member on the side upon which the nozzle opens its mouth made of polybenzimidazole or polyimide.

4 Claims, 26 Drawing Sheets

PRINTING DEVICE

BACKGROUND OF THE INVENTION

1. Field of the Invention

The present invention generally relates to printing devices. The present invention specifically relates to a printing device that ejects an ejecting medium, and to a printing device that mixes and ejects metering and ejecting media. More specifically, this invention relates to a printing device that has the surface of a nozzle member made of polybenzimidazole, which allows high-resolution reproduction of documentary images and improved productivity. Moreover, the invention having the nozzle member made of polybenzimidazole is capable of being manufactured by pressure molding or injection molding, which also promotes improved productivity.

2. Description of the Related Art

Recently, preparation of documents based on computer systems, such as so-called desk top publishing, is favored by clerks in offices. Along with such tendency, a growing need exists among such people for a machine capable of faithfully reproducing images of natural objects in photos together with characters and figures. As a result, a strong demand exists for a high-grade printing device capable of high-quality printing of the images of natural objects. For such printing device to be produced, it is important to reproduce intermediate tones faithfully.

A printer which, only when it receives printing signals, ejects ink droplets through a nozzle onto a printing medium, such as paper and film, or a so-called on-demand type printer have spread quickly in recent years because they can be small in size and produced at a low cost.

A variety of methods have previously been proposed for ejecting ink droplets. However, the methods dependent on the use of a piezoelectric element or a heating element have been generally used. The former consists of ejecting ink under the pressure wrought by a deformed piezoelectric element, and the latter depends on the pressure of bubbles which develops when ink is heated to a boiling point with a heating element.

A variety of methods have also been previously proposed to provide an on-demand type printer, as described above, capable of reproducing intermediate tones faithfully. One such method is to control the size of droplets by adjusting the voltage or width of an electric pulse applied to a piezoelectric element or a heating element, so that the size of printed dots corresponds well with the intermediate tone to be reproduced. With this method, however, if the voltage or width of the pulse delivered to the piezoelectric element or the heating element is chosen too small, ink will not be ejected. Thus, the size of the smallest droplet has a certain limit. This imposes a number of limitations to this method: reproducible tone gradations is limited in number; reproduction of low tones is particularly difficult; and satisfactory reproduction of the images of natural objects can scarcely be achieved.

A second method does not depend on the alteration of dot size. Instead, this method uses pixels each comprising a matrix of 4×4 dots and reproduces tones by adjusting the density of pixel depending on the number of excited matrices, or by using the so-called dither method. In this case, each pixel can reproduce 17 different tones. However, when a test pattern with a certain dot density is printed by the two methods, and both printings are compared, the printing by the second method has a resolution one fourth that by the first method. Accordingly, the printing achieved by the second method is too rough to be applied for reproducing the images of natural objects.

In view of this, the present inventors have proposed a printing device capable of faithfully reproducing the images of natural objects without impairing resolution. In this regard, concentration of an ejecting ink droplet can be varied by the addition of diluent to the ink during ejection, so that the printed density of ink can be controlled.

A printing head suitable for such printing device should have a first nozzle member for ejecting medium and a second nozzle member for metering medium placed close to each other. A predetermined volume of the metering medium is pressed out from the second nozzle member towards the first nozzle member to be mixed with the ejecting medium in close vicinity to the orifice of the first nozzle member, so that the ejecting medium can be ejected out together with the metering medium and thereby to effect mixing/ejection of the metering and ejecting media. In the printing device with such printer head, the volume of a metering medium containing either ink or diluent can be varied so that the mixing ratio of ink and diluent can be varied, which enables alteration of dot density. This enables faithful reproduction of the images of natural objects. The metering medium and the ejecting medium can be either ink or diluent; when one is ink, the other is diluent, and vice versa.

A printing device that exercises mixing/ejecting ink and diluent to achieve a faithful reproduction of an image controls the mixing ratio of ink and diluent precisely according to the tone of the image to be printed. For this to be achieved, ink and diluent must be kept separated when they are not mixed or when they are at a stand-by state. If they are in contact with each other while they are at a stand-by state, ink and diluent will diffuse mutually into the other's nozzle: ink to a diluent nozzle and diluent to an ink nozzle. This inadvertent mixture of ink and diluent will gravely affect the mixing ratio of ink and diluent in dots subsequently printed, thereby making it impossible to faithfully reproduce the tone of an image. Accordingly, such printer head will not allow high-resolution reproduction of documentary images. In view of this, providing a space between the orifices of the metering medium nozzle and of the ejecting medium nozzle with a liquid-repellent property is desirable.

This invention is also applicable to a printing device furnished only with an ink nozzle, because adherence of ink around the orifice of the ink nozzle would interfere with smooth ejection of subsequent ink from the orifice so that ink ejection would become instable in its direction. Accordingly, such printer head will not allow high-resolution reproduction of documentary images either.

Adherence of ink around the orifice of the ink nozzle would readily occur in the printing device furnished with the ink and diluent nozzles, unless a liquid-repellent property is conferred to a space between the two nozzles. The liquid-repellent substance previously used for the present purpose generally includes polytetrafluoroethylene or the like. Such substance is applied around the orifices of the nozzles of such printing devices as described above.

As the form of nozzles, particularly of their orifices, gravely affects the direction of liquids ejected from the nozzles, and thus the quality of printed characters, it is conventional to process the nozzles by abrasion with an excimer laser. Abrasion with excimer laser, however, cannot be applied to polytetrafluoroethylene or similar type compounds. To address such inconvenience, a method such as that disclosed in Japanese Unexamined Patent Publication No. 6-328698 is proposed where a material capable of absorbing light whose wave length corresponds to that of an excimer laser is allowed to disperse in polytetrafluoroethylene, and the resulting compound is processed with the excimer laser to prepare a nozzle.

With the method as described in Japanese Unexamined Patent Publication No. 6-328698, however, amenability of a material to processing by abrasion with excimer laser and the liquid-repellency of the processed material can scarcely be compatible: when the former is emphasized, the latter is more or less sacrificed, and vice versa. Further, abrasion with excimer laser, when applied to prepare a nozzle in the considerably thick substance of a film made of polytetrafluoroethylene, can scarcely allow fine processing, which will easily result in development of minute flaws around the processed parts.

Moreover, abrasion with excimer laser is rather complicated in operation: management of gas and the optical system is cumbersome, and large amounts of materials must be consumed in association. These things will contribute to raise the cost for production. In view of this, it is desirable when abrasion with excimer laser is applied for the formation of a nozzle of the printer head of the above-described printing device, to reduce the time necessary for abrasion as much as possible. This will be accomplished by combining injection molding and abrasion with excimer laser, as is disclosed in the above-described Japanese Unexamined Patent Publication No. 6-328698. Specifically, a resin such as polysulfone or the like is subjected to injection molding to produce a film that has a raw form of nozzle formed therein to which a liquid-repellent membrane as described above is applied. Then, abrasion with excimer laser is applied to this assembly, to bore a hole through the polysulfone film and the liquid-repellent membrane. This procedure allows fine working necessary for preparation of the nozzle orifice and its vicinity whose configuration gravely affects the direction the droplet takes when ejected.

When polysulfone or a material having a thermal resistance up to 180° C. is used for this purpose, the material to be used for the formation of the liquid-repellent membrane should polymerize at around 150° C. Further, as described above, the material is necessarily limited to polytetrafluoroethylene having a material dispersed therein that can absorb the light having the same wave length with an excimer laser used for abrasion. These impose severe restrictions on the choice of appropriate materials. This will result in lowered productivity.

Further, if polysulfone is used as a material for the purpose here concerned, because its thermal resistance is rather low, various restrictions will be imposed. For example, a restriction will be imposed on the processes subsequent to the formation of the nozzle, such as bonding of other members onto the nozzle surface. This will likewise result in lowered productivity.

Therefore, a need exists for an improved printer head and methods for preparing same that enable the faithful reproduction of documentary images while also promoting productivity.

SUMMARY OF THE INVENTION

The present invention provides printing devices that address the problems inherent in conventional printing devices. The present invention provides a printing device that ensures liquid-repellency of the periphery of nozzle orifices, thereby enabling faithful reproduction of documentary images, enabling formation of nozzles by abrasion with excimer laser, and allowing a satisfactory productivity. Additionally, the present invention provides a printing device capable of having its nozzle members made of a wide variety of materials, and prepared by various procedures or their combinations, including injection molding. As a result, the invention of the present application promotes satisfactory productivity.

The present invention specifically relates to the use of polybenzimidazole or polyimide compounds as materials of the printer head of the printing device. Use of such materials ensure the liquid-repellency of the nozzle member, and allows those parts to be processed by abrasion with excimer laser. More specifically, in an embodiment, the printing device of the present invention has in its printer head, which has a chamber to contain an ejecting medium and a nozzle member to communicate with that chamber, at least the periphery of the nozzle orifice and/or the nozzle body made of a polybenzimidazole or a polyimide compound. Thus, the nozzles of the present invention can be made of a wide variety of materials and can be formed by various procedures and their combinations, including injection molding.

In another embodiment, the printing device of the present invention has a printer head having a first chamber containing an ejecting medium and a second chamber containing a metering medium. In the printing head, a first nozzle member communicates with the first chamber and a second nozzle member communicates with the second chamber, such chambers being placed adjacent to each other. For purposes herein, such nozzle members have a nozzle orifice (outer portion) and a nozzle body (inner portion). At least the periphery of the nozzle orifice and the nozzle body are made of polybenzimidazole or polyimide.

Pursuant to the present invention, the polybenzimidazole to be used as a material for the periphery of the nozzle orifice may include various chemicals. Preferably, the polybenzimidazole includes chemicals having the structure of the following Formula A:

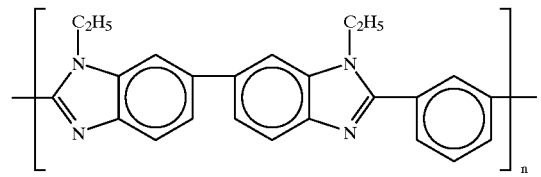

wherein n represents a positive integer.

The polybenzimidazole preferably has a water-absorbing property of 4.0% or less, when left in an atmosphere of 76% RH for 24 hours. For example, PBI matrix resin solution can be used as such polybenzimidazole compound. A commercially available solution that may be used is a cerazol painting grade solution available from Hoechst and is sold under the trademark NPBI.

In an embodiment, other portions of the printer head, including the nozzle body and chambers containing the fluids, may also be made of polybenzimidazole. The polybenzimidazole to be used as a material for such other portions of the printer head may include various chemicals. Preferably, the other portions of the printer head, aside from the periphery of the nozzle orifice, include chemicals having the structure of the following Formula B:

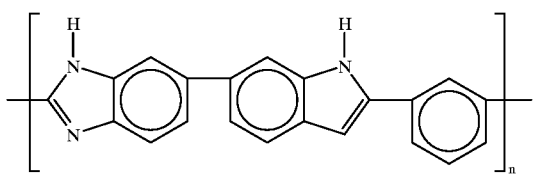

where n represents a positive integer.

When the periphery of the nozzle body, as well as other portions of the printer head, is made of polybenzimidazole as indicated above, it can preferably be processed by pressure molding or by injection molding. An example of a suitable polybenzimidazole that can be used is available from Hoechst and is sold under the trademarks U-60 and TU-60. Moreover, when the periphery of the nozzle body is made of such a polybenzimidazole, the periphery of the nozzle orifice may be made of a material capable of polymerizing at a temperature of 150° C. or higher. For example, as detailed below, polyimide polymers into which a fluorine polymer has been dispersed may be used as material for the periphery of the nozzle orifice. In an embodiment, such fluorine polymer may be a copolymer of tetrafluoroethylene and hexafluoropropylene.

In another embodiment of the printing device of this invention, at least both the periphery of the nozzle orifice and the nozzle body may be made of polybenzimidazole. The materials as described above may be used such as polybenzimidazole. In such an embodiment, the polybenzimidazole used for the periphery of the nozzle orifice can be a material that polymerizes at a considerably higher temperature of more than 300° C.

Since the periphery of the nozzle orifice is made of polybenzimidazole, the present invention ensures liquid-repellency around the periphery of the nozzle orifice. In addition, the printing device of this invention allows the nozzle to be formed with a laser. Preferably, the nozzle is formed by abrasion with an excimer laser.

Moreover, as detailed above for the printing device of this invention, other portions of the printer head, namely the parts excluding the periphery of the nozzle orifice (i.e. nozzle body), may be made of polybenzimidazole or polyimide. Because these substances are highly resistant to heating, the periphery of the nozzle orifice can be made of a material that polymerizes at a considerably higher temperature than 150° C. Because such materials are necessarily suitable for abrasion with excimer laser, the printing device of this invention will thus allow the nozzle orifice of the printing head to be processed by abrasion with excimer laser. When other portions of the printer head are made of polybenzimidazole, the nozzle can be formed by a method including abrasion with excimer laser or the like.

Further, as mentioned above, at least the periphery of the nozzle orifice can be made of a polyimide polymer in which a fluorine polymer is dispersed. The fluorine polymer may include various chemicals. Preferably, the fluorine polymer includes a copolymer of tetrafluoroethylene and hexafluoroethylene or the like which have a structure as represented by the following Formula C:

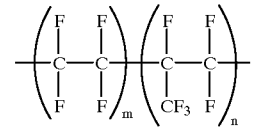

where m and n are mole percentages; m being a positive integer from 1 to 99 and n being a positive integer from 99 to 1. An example of a suitable fluorine polymer that may be used is available from DuPont and is sold as Teflon® coating 958-207. The polyimide polymer may have a property to polymerize when heated to 300° C. of higher.

In another embodiment, the polyimide polymer, besides those mentioned above, may include various chemicals including aromatic polyimides. It may include further the compounds which have a structure as represented by the following Formula D and Formula E:

[Formula D]

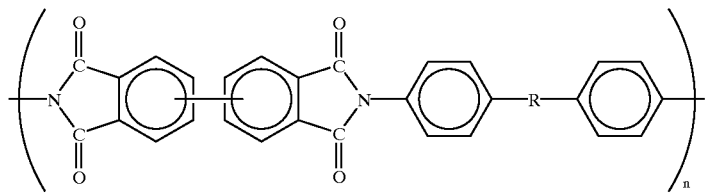

where n represents a positive integer; and R is any divalent bridging unit. For example, R can be one of the following units: O, CO, $CH_2$, or $C_2H_4$.

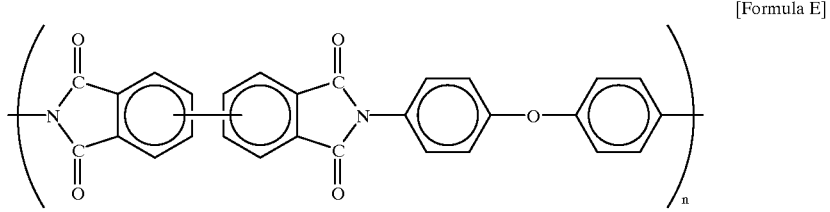

[Formula E]

where n represents a positive integer. Such polyimide polymers preferably have a water absorbance of 0.4% or less when kept in water of 23° C. for 24 hours. Such polyimide polymers may further have a property to polymerize when heated to 180° C. or lower.

In an embodiment, the polyimide polymer may include polyimidesiloxane. The polyimidesiloxane preferably has a structure as represented by the following Formula F and Formula G:

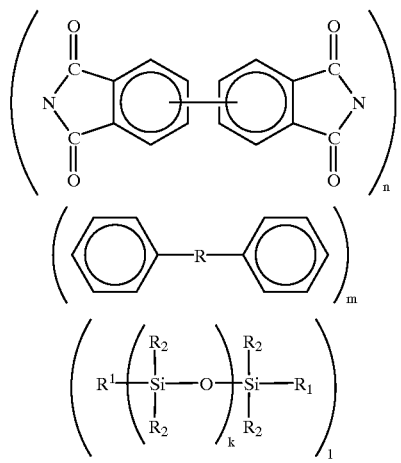

[Formula F]

where k, l, m and n represent positive integers;
R is a divalent bridging unit;
$R_1$ can be $CH_2$, $(CH_2)_2$, $(CH_2)_3$, $(CH_2)_4$, or $(CH_2)_5$; and
$R_2$ can be $CH_3$, $C_2H_5$, or $C_3H_7$.

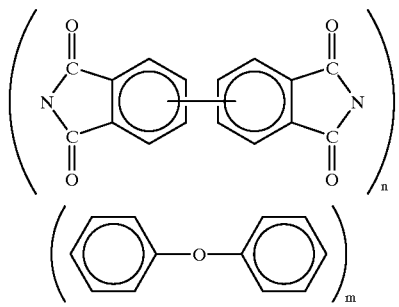

[Formula G]

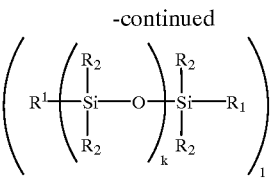

-continued where
k, l, m and n represent positive integers;
R is a divalent bridging unit;
$R_1$ can be $CH_2$, $(CH_2)_2$, $(CH_2)_3$, $(CH_2)_4$, or $(CH_2)_5$; and
$R_2$ can be $CH_3$, $C_2H_5$, or $C_3H_7$.

The polyimidesiloxane is preferably a compound which results after having part of its aromatic hydrocarbon component substituted by siloxane, and has a 3–25 weight % of Si with respect to polyimide. Suitable polyimide polymers, for example, that satisfy these requirements are available from Ube Industries and are sold under the trademarks Yupicoat FS-100L and Yupifine FP-100.

In yet another embodiment, the polyimide polymer, besides those detailed above, may include compounds having a structure as represented by the following Formula H:

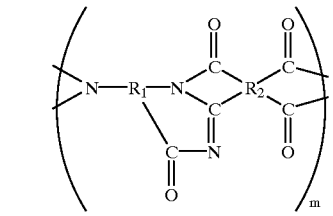

where m represents a positive integer. Such a suitable polyimide polymer is a coating type polyimide sold under the trademark PIQ6400 provided by Hitachi Chemicals.

In an embodiment therefore, the printing device of this invention has at least the periphery of the nozzle orifice made of a polyimide polymer in which a fluorine polymer is dispersed, thereby ensuring liquid-repellency around the periphery of nozzle orifice. In addition, because the polyimide polymer can be appropriately processed by abrasion with excimer laser, the printing device of this invention allows the nozzle to be formed by abrasion with an excimer laser.

In another embodiment, parts other than the periphery of the nozzle orifice (i.e. nozzle body and medium chambers), are made of a second polyimide polymer with a dispersion of a fluorine polymer. Because these substances are highly resistant to heating, the periphery of the nozzle opening can be made of a material that polymerizes at a considerably high temperature of about 300° C.

The fluorine polymer and polyimide polymer used for the liquid-repellent membrane may include the compounds as described above. For example, Teflon® coating 958-207 available from DuPont or a copolymer of tetrafluoroethylene and hexafluoropropylene can be used as the polyimide polymer with a fluorine polymer dispersed within.

Additional features and advantages of the present invention are described in, and will be apparent from, the detailed description of the presently preferred embodiments as well as the drawings.

DESCRIPTION OF THE PRESENTLY PREFERRED EMBODIMENTS

Figure 1:
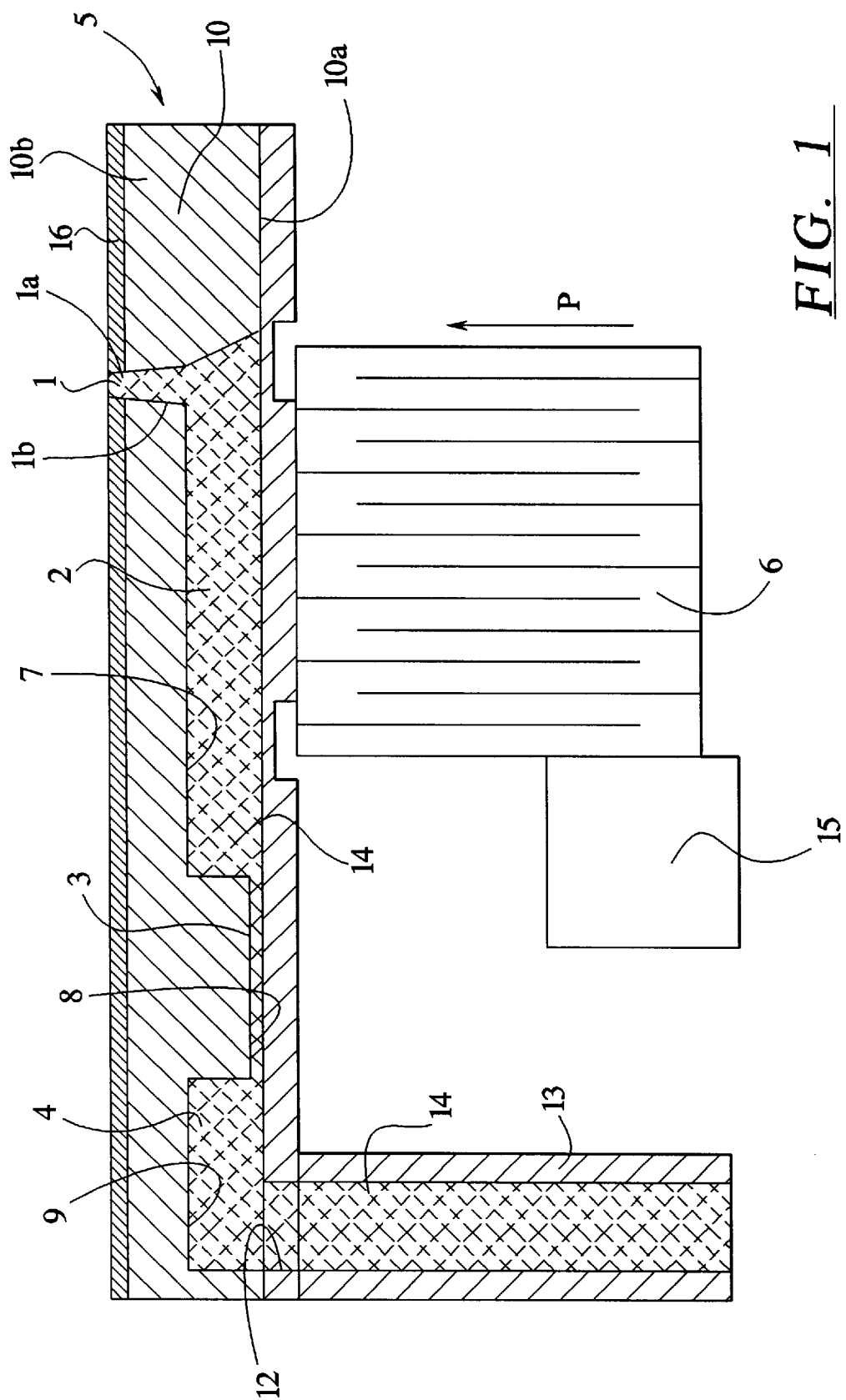
FIG. 1 is a schematic diagram of the cross-section of a first printing device according to this invention.

The present invention, in an embodiment, provides an improved printing device constructed as to eject only ink as an ejecting medium. The printing device has a printing head as illustrated in FIG. 1. The printing head includes an orifice plate member 5 including a nozzle member 1, an ink-chamber 2, an ink feed channel 3, and an ink feed aperture 4. The nozzle member 1, as identified herein, consists of a nozzle orifice 1a and a nozzle body 1b. The printer head also includes a piezoelectric element 6 placed opposite to the ink-chamber 2. In addition, the printing device is provided with a driving unit and a control unit (not shown).

The orifice plate member 5 is composed of a base plate 10 having a first concave surface 7, which forms part of the ink-chamber 2, a second concave surface 8 shallower in its height than the first concave surface 7 and which forms part of the ink feed channel 3, a third concave surface 9 deeper in its height than the second concave surface 8 and which forms part of the ink feed aperture 4. The surfaces are prepared in such a way that their open sides intercommunicate with each other and are flush with a main surface 10a. And, the surfaces have a passage formed from the first concave surface up to a surface 10b, or a surface opposite to the surface 10a to make a nozzle therefrom. A vibrating plate 11 is attached onto the 10a side of the base plate to allow it to act as a lid covering for the concave surfaces. Such concave surfaces can take, for example, a form whose cross-section is shaped like a U. Whereas, the nozzle member 1 may take a conical form whose circular, ellipsoid, or rectangular base tapers to a tiny orifice at the back surface 10b to form a passage there.

A space between the third concave surface 9 and vibrating plate 11 forms the ink feed aperture 4. A second space between the second concave surface 8 and vibrating plate 11 forms the ink feed channel 3. The third space between the first concave surface 7 and vibrating plate 11 forms the ink chamber 2. Each of these spaces are in fluid communication with each other and form, together with the nozzle member 1, a continuous passage for fluid.

Part of the vibrating plate 11 that comes in contact with the third concave surface 9 has an opening 12. To that opening 12 prepared close to the ink feed aperture 4 is connected an ink feed pipe 13 that supplies ink from an ink tank placed outside (not illustrated) to the printer head. Ink from the ink tank is supplied through the ink feed pipe 13 to the ink feed aperture 4. The ink then passes through the ink feed channel 3 to the ink chamber 2 and to the nozzle member 1. The vibrating plate 11 has thin grooves placed on its part so as to make its portion corresponding to the ink chamber 2 ready to be displaced.

Laminated piezoelectric elements can be used as material composing the piezoelectric element 6. This embodiment describing the printing device constructed to eject only ink as an ejecting medium incorporates such laminated piezoelectric elements. The piezoelectric element 6, as described above, is placed on the part of the vibrating plate 11 which corresponds to the ink chamber 2 in such a manner that the long axis of the piezoelectric element 6 contacts the vibrating plate at a right angle. The opposite end is fixed onto a supporting body 15.

The laminated piezoelectric elements composing the pressuring element 6 extend/contract in the direction of their long axis. As being stabilized at one end by a supporting body 15, the piezoelectric element 6, when it extends, exerts a pressure onto the vibrating plate 11 in the direction indicated with arrow P in FIG. 1. In association, ink 14 in the ink chamber 2 is pressurized, and ejected from the nozzle member 1. During this operation, no measurable counterflow of ink towards ink feed aperture 4 will take place. This is because the ink feed channel 3 is narrower than the ink chamber 2.

For the printing device of this embodiment to be used for printing, only the piezoelectric element 6 is allowed to exert a pressure upon ink 14 contained in the ink chamber 2. Then, ink 14 is ejected onto a printing medium (not illustrated). The tone of an ink dot can be adjusted by choosing an appropriate size of ink droplet, or number of excited unit dots in the pixel matrix.

Figure 2:
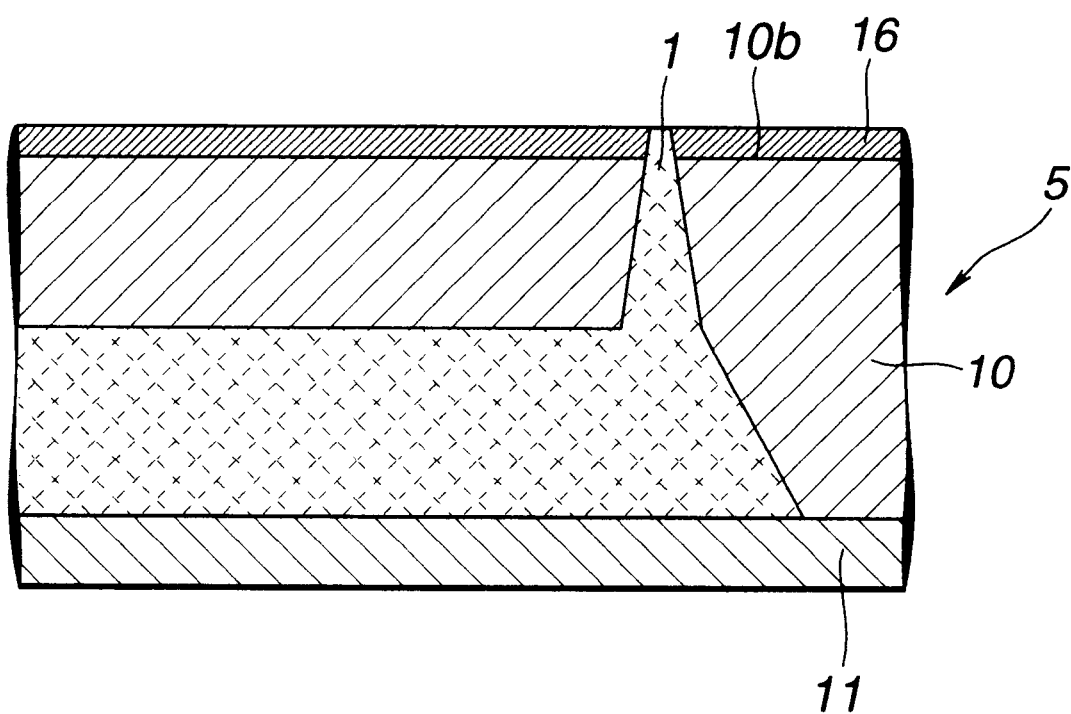
FIG. 2 is an enlarged view of part of the first printing device according to this invention.

The printing head of the printing device of this embodiment, as further indicated in the enlarged cross-section in FIG. 2, has a liquid- repellent membrane 16. Membrane 16 is formed at least on the periphery of the nozzle orifice 1a of the nozzle member 1 on the back surface 10b or the side of the base plate 10 where the nozzle member 1 is formed. As illustrated in FIG. 1, a liquid-repellent membrane is formed all over the back surface 10b.

This liquid-repellent membrane 16 can preferably be made of polybenzimidazole. A variety of chemicals can be used for the polybenzimidazole. Preferably, chemicals as represented by the following Formula A are used:

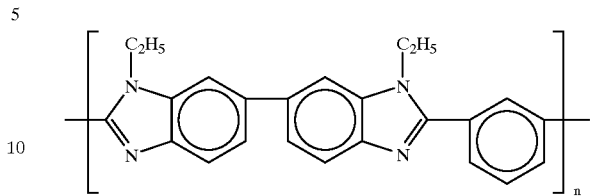

wherein n represents a positive integer. Preferably, this polybenzimidazole compound has a molecular weight of about 5,000 to 1,000,000.

In the printing device of this example, the base plate 10 (encompassing the nozzle body 1b) should preferably be made of polyimide or a different kind of polybenzimidazole from the above-described one of Formula A. A variety of chemicals are appropriate for the polybenzimidazole to be used as a material of the base plate. Preferably, chemicals as represented by the following Formula B are used for the polybenzimidazole of the base plate:

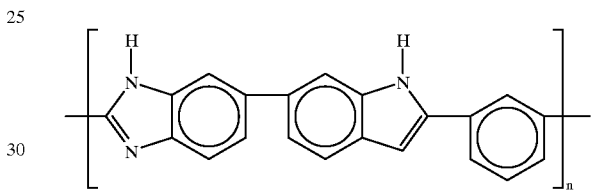

where n represents a positive integer. This polybenzimidazole preferably has a molecular weight of about 5,000 to 1,000,000. When the base plate 10 is made of such polybenzimidazole, it can be preferably processed by pressure molding or by injection molding.

When the base plate 10 is made of polybenzimidazole as described above, the liquid-repellent membrane 16 may be formed of a substance polymerizing at 150° C. or higher, as well as of polybenzimidazole. For example, polyimide polymers into which a fluorine polymer has been dispersed may be used as the liquid-repellent membrane 16. In an embodiment, the fluorine polymer is a copolymer of tetrafluoroethylene and hexafluoropropylene.

The printing device of this example has a liquid-repellent membrane 16 with a liquid-repellency formed at least on the periphery of the nozzle orifice 1a of the printing head surface upon which the orifice is formed. This arrangement ensures liquid-repellency at the periphery of the nozzle orifice 1a, prevents adhesion of excess ink on the same place and contributes to stability of ink ejection, thereby achieving high-resolution image formation.

Figure 3:
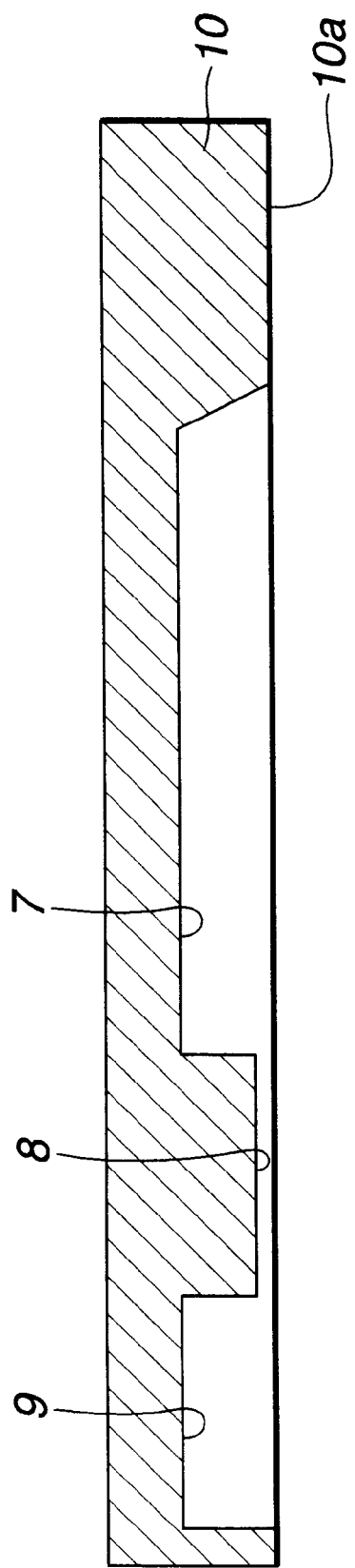
FIG. 3 is a schematic diagram of the cross-section of the printing device according to this invention illustrating the procedures of a first method used to produce the printer.

The present invention also provides a method for producing such printing device as described above. The description now detailed will focus on a method for producing such a printer head. As illustrated in FIG. 3, a base plate 10 is so processed as to give a first concave surface 7, a second concave surface 8 and a third concave surface 9 which open towards a main surface 10a. A first concave section 7, second concave section 8 and third concave section 9 are so processed as to give a continuous passage, and its configuration is as described above. As indicated above, the material that may be utilized for this base plate 10 includes a polybenzimidazole or polyimide compound. Such material, however, should be a different polybenzimidazole or polyimide from the one used for the liquid-repellent membrane 16.

In a preferred embodiment, polybenzimidazole or polyimide is used for the base plate 10. The polybenzimidazole used for the base plate 10 should preferably have a structure as represented by the above Formula B. Suitable polybenzimidazole chemicals that may be used, for example, are U-60™ appropriate for pressure molding and TU- 60™ appropriate for injection molding, both available from Hoechst. Such polybenzimidazole compounds have good wettability, are suitable for processing by abrasion with excimer laser, allow easy processing of nozzles, and prevent practically all entry of air bubbles into the nozzles. When using a polyimide, any polyimide may be used for the base plate 10 as long as it has such a grade as to be applied for injection molding. An example of a suitable chemical is polyimide available from Mitsui Toatsu Chemicals.

Figure 4:
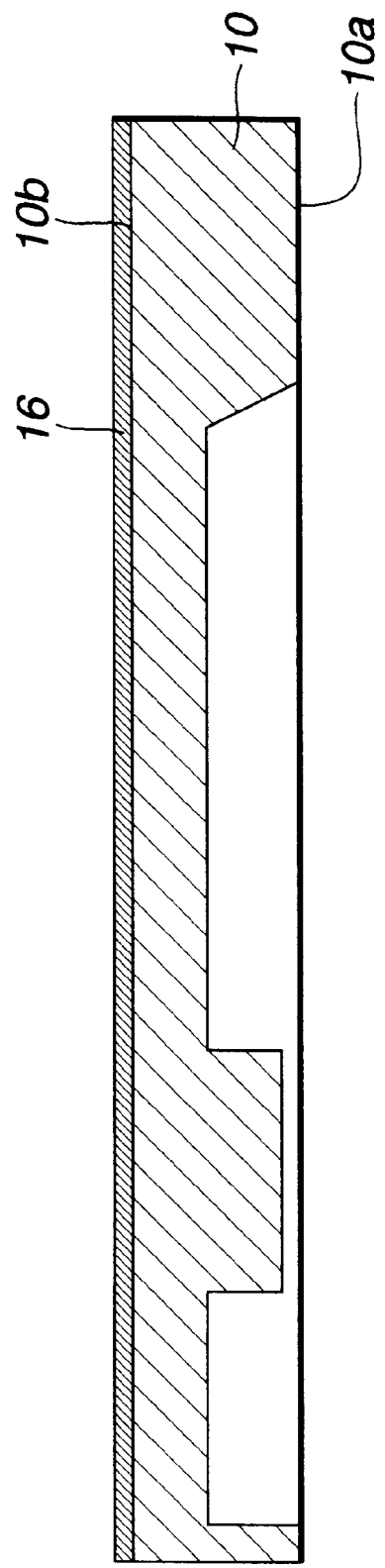
FIG. 4 is a schematic diagram of the cross-section of the printing device according to this invention illustrating a procedure to prepare a liquid-repellent membrane according to the first method of the present invention.

Then, as illustrated in FIG. 4, a liquid-repellent membrane 16 is formed on a back surface 10b or the surface opposite to the main surface 10a of the base plate 10. The liquid-repellent membrane 16 should preferably be made of such polybenzimidazole and has a structure as represented by the above Formula A. Such polybenzimidazole should also preferably have a water-absorbing property of 4.0% or less, when left in an atmosphere of 76% RH for 24 hours.

An example of a suitable polybenzimidazole is a PBI matrix resin solution, such as NPBI™ of cerazol painting grade available from Hoechst. This PBI matrix resin solution is a mixture that results after polybenzimidazole has been dispersed in an N,N-dimethylacetoamide solvent to give a 10 wt % resin solution, and is a liquid mass whose viscosity is 300±50 CP.

The method to apply this mixture onto the base plate 10 may include coating by spraying, coating by dipping, and electrostatic coating followed by baking at 300° C. or higher for 30 minutes or longer. A liquid-repellent membrane 16, formed by this method, shows no adhesiveness in a wide temperature range from room temperature to 200° C. Alternatively, a polybenzimidazole material, which satisfies the above requirements, is allowed to disperse in an N,N-dimethylacetoamide solvent to give a 10 wt % resin solution. The resulting mixture may then be used as a coat on the base plate 10.

When a different polybenzimidazole or polyimide material from the one used for the liquid-repellent membrane 16 is used as a material for the base plate 10 as in this embodiment, a baking process requiring heating exceeding 300° C. or higher can be applied to the base plate 10, which would be impossible if the base plate 10 were made of polysulfone or polyethersulfone.

Figure 5:
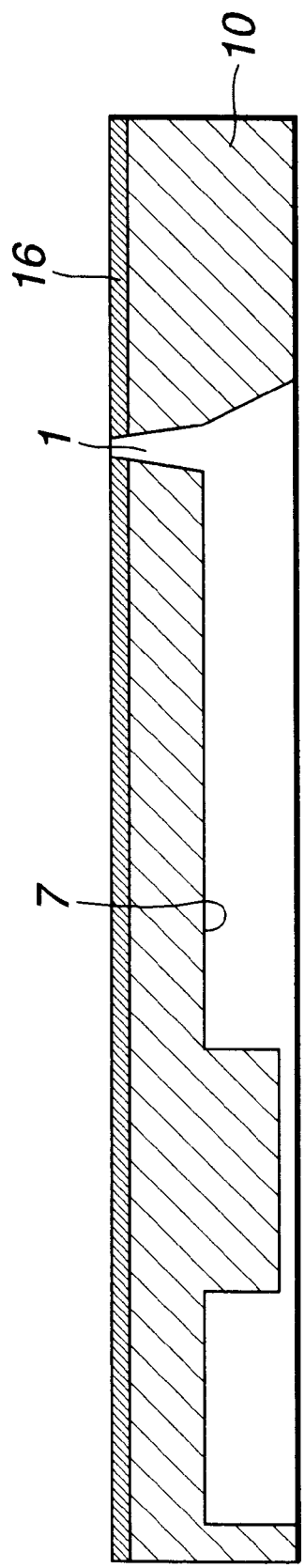
FIG. 5 is a schematic diagram of the cross-section of the printing device according to this invention illustrating a procedure to prepare a nozzle according to the first method of the present invention.

Then, as illustrated in FIG. 5, a nozzle member 1 is formed with a laser processing machine which bores a hole penetrating from the bottom of the first concave surface 7 through the base plate 10 and the liquid-repellent membrane 16. With the printing device of this example, a polybenzimidazole or polyimide material making the base plate 10 and a second polybenzimidazole material making the liquid-repellent membrane 16 both allow processing by abrasion with excimer laser, and thus, the nozzle member 1 can be formed through processing by abrasion with excimer laser. Accordingly, the printing device of this invention allows simplified processing of nozzles, which contributes to improvement of productivity. Moreover, polybenzimidazole and polyimide can be so precisely processed by abrasion with excimer laser that the nozzle member 1 is formed practically free from any flaws such as minute cracks and scales. This contributes to improvement of net yield, and to improvement of productivity.

Figure 6:
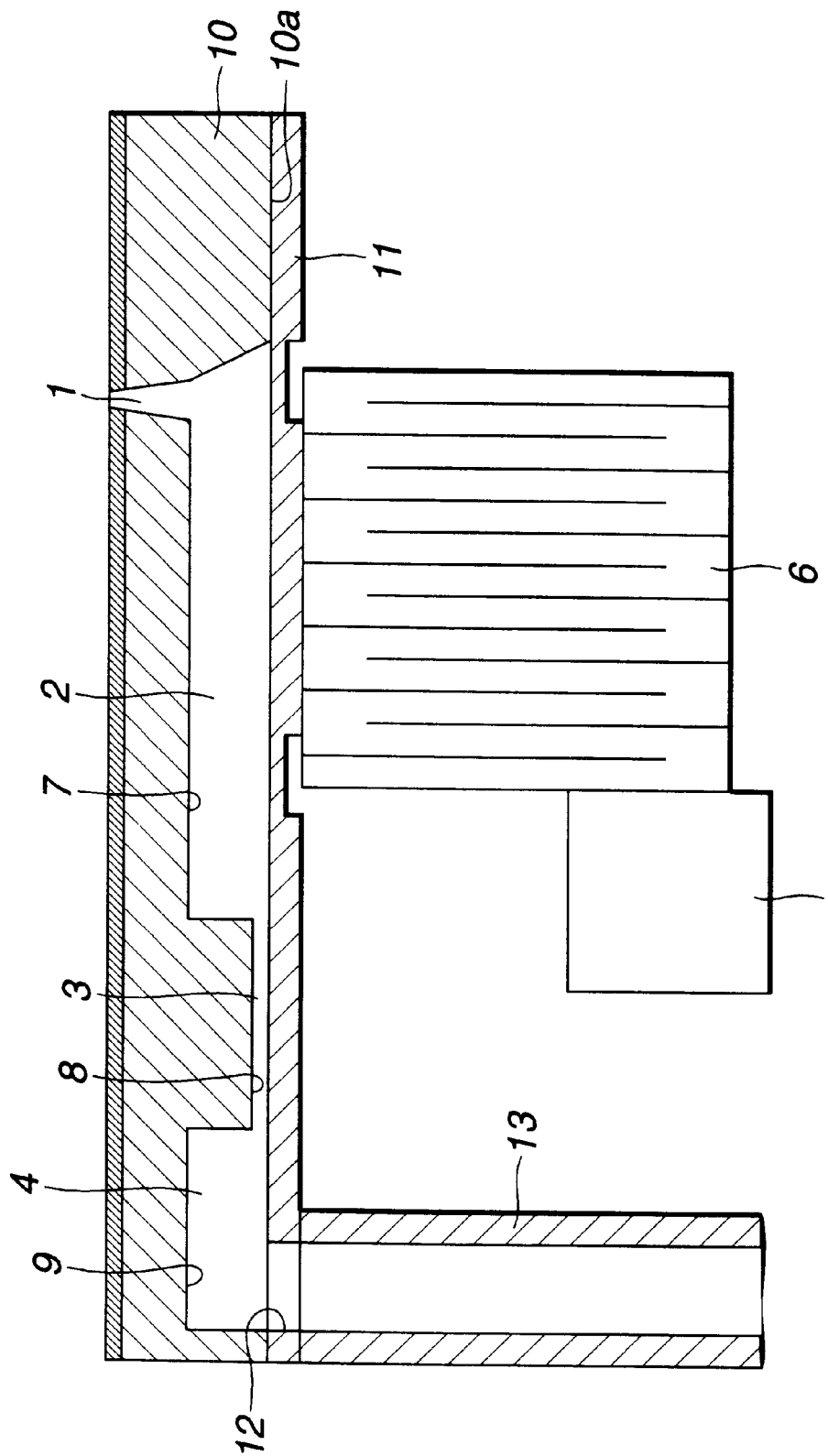
FIG. 6 is a schematic diagram of the cross-section of the printing device according to this invention illustrating a procedure to arrange a vibrating plate, etc., into a printer head according to the first method of the present invention.

Then, as shown in FIG. 6, a vibrating plate 11, which also acts as a lid, is placed on the main surface 10a, being the side upon which the concave surfaces were prepared on the base plate 10. Thus, a space to act as an ink feed aperture 4 is formed between the third concave surface 9 and the vibrating plate 11. A second space to act as an ink feed channel 3 is formed between the second concave surface 8 and the vibrating plate 11. And, a third space to act as an ink chamber 2 is formed between the first concave surface 7 and the vibrating plate 11. These spaces communicate with each other and form, together with the nozzle member 1, a continuous passage for fluid.

An opening 12 is formed on part of the vibrating plate 11 opposite to the third concave surface 9, and that opening communicates with part of the ink feed aperture 4. The vibrating plate 11 has thin grooves placed on its part so as to make its portion corresponding to the ink chamber 2 ready to be displaced. A piezoelectric element 6 composed of laminated piezoelectric elements is placed on the portion of the vibrating plate 11 which corresponds to the ink chamber 2. An ink feed pipe 13 is attached to an opening 12, and a supporting member 15 is attached to the piezoelectrinc element 6 to complete the printer head.

Figure 7:
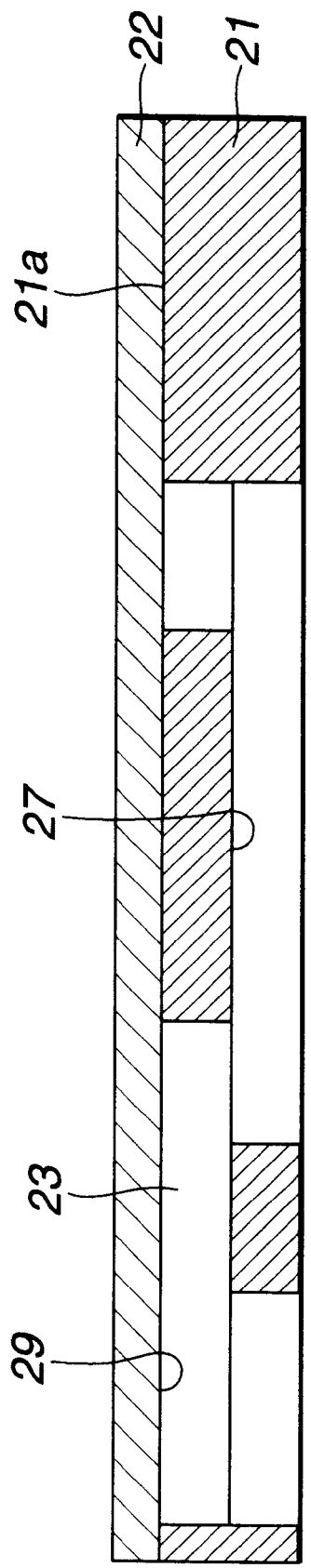
FIG. 7 is a schematic diagram of the cross-section of the printing device according to this invention illustrating the procedures of a second method used to produce the printer, particularly a procedure to prepare a metal plate with a polymer film bonded thereupon.

In the above example, a base plate 10 has concavities formed according to a predetermined design by a processing means such as injection molding. Alternatively, the base plate 10, instead of being formed as above, can be prepared by bonding a polymer film made of polyimide or the like onto a metal plate. When such metal plate is used, it should have a slightly different structure. As illustrated in FIG. 7, a polymer film 22 is bonded onto the main surface 21a of a metal plate 21, whereby a first concave surface 27 to form part of an ink chamber, a third concave surface 29 to form part of an ink feed aperture, and an ink feed channel 23 to connect between the first concave surface 27 and the third concave surface 29 are produced, and the assembly acts as a base plate.

Such metal plate 21 may be made of, for example, stainless steel, and the polymer film 22 may be made of polyimide or the like. If the film is made of polyimide, it should have more wettability because a hole to act as a nozzle is bored through this film. Further, the film should be amenable to processing by abrasion with excimer laser. As such polyimide film, for example, Capton film™ available from Toray-Dupont can be used. Further the film should be preferably bonded onto the metal plate by having a coat type polyimide material with a low glass transition temperature inserted between itself and the metal plate. As such polyimide material, for example, Neoflex™ (glass transition temperature being 200° C.) available from Mitsui Toatsu Chemicals can be used.

The polymer film 22 may also be made of polybenzimidazole having a structure as represented by the above Formula B. Such polymer film can be produced after the polybenzimidazole has been processed into a film or a very thin plate.

The base plate composed of a metal plate 21 and a polymer film 22 as described above is as strong in resistance to chemical abrasion as the aforementioned base plate made of a single material.

Figure 8:
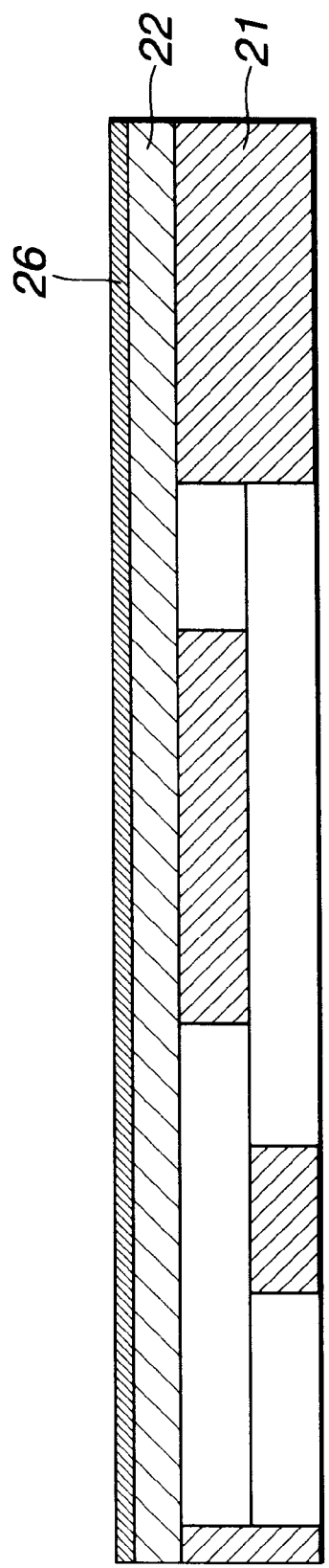
FIG. 8 is a schematic diagram of the cross-section of the printing device according to this invention illustrating a procedure to prepare a liquid-repellent membrane according to the second method of the present invention.

Next, a liquid-repellent membrane 26 is formed upon the polymer film 22 as illustrated in FIG. 8. The liquid-repellent membrane 26 can preferably be formed with polybenzimidazole having a structure as represented by the above Formula A. Such polybenzimidazole preferably has a water absorbance of 4.0% or less when left in an atmosphere of 76% RH for 24 hours. To form the liquid-repellant membrane 26 made of such polybenzimidazole, the polybenzimidazole can be coated onto the polymer film.

Similar to that detailed above with respect to FIG. 4, an example of a suitable polybenzimidazole is a PBI matrix resin solution, such as NPBI™ of cerazol painting grade available from Hoechst. This PBI matrix resin solution, such as the NPBI™ provided by Hoechst, is a mixture that results after polybenzimidazole has been dispersed in an N,N-dimethylacetoamide solvent to give a 10 wt % resin solution, and is a liquid mass whose viscosity is 300±50 CP.

The method to apply this mixture onto the polymer film 22 may include coating by spraying, coating by dipping, and electrostatic coating followed by baking at 300° C. or higher for 30 minutes or longer. A liquid-repellent membrane 26, formed by this method, shows no adhesiveness in a wide temperature range from room temperature to 200° C. Alternatively, a polybenzimidazole material, which satisfies the above requirements, is allowed to disperse in an N,N-dimethylacetoamide solvent to give a 10 wt % resin solution. The resulting mixture may then be used as a coat on the polymer film 22.

When a different polybenzimidazole or polyimide material from the one used for the liquid-repellent membrane 26 is used as a material for the polymer film 22 as in this embodiment, a baking process requiring heating exceeding 300° C. or higher can be applied to the polymer film 22, which would be impossible if the polymer film 22 were made of polysulfone or polyethersulfone.

Figure 9:
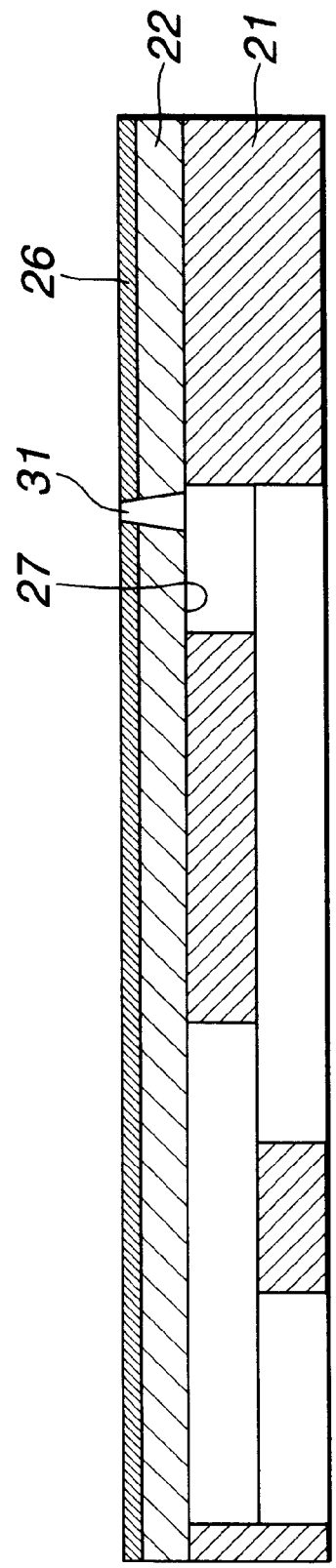
FIG. 9 is a schematic diagram of the cross-section of the printing device according to this invention illustrating a procedure to prepare a nozzle according to the second method of the present invention.

Then, as illustrated in FIG. 9, a nozzle member 31 is formed with a laser processing machine which bores a hole penetrating from the bottom of the first concave surface 27 of the metal plate 21 through the polymer film 22 and the liquid-repellant membrane 26. With the printing device of this example, a polybenzimidazole or polyimide material making the polymer film 22 and a second polybenzimidazole material making the liquid-repellent membrane 26 both allow processing by abrasion with excimer laser, and thus, the nozzle member 31 can be formed through processing by abrasion with excimer laser. Accordingly, the printing device of this embodiment, similar to the embodiment detailed above, allows simplified processing of nozzles, which contributes to improvement of productivity. Moreover, polybenzimidazole and polyimide can be so precisely processed by abrasion with excimer laser that the nozzle member 31 is formed practically free from any flaws such as minute cracks and scales. This reduces failures during processing, contributes to improvement of net yield, and contributes to improvement of productivity.

Then, similarly as described earlier with reference to FIG. 6, a vibrating plate, an ink feed pipe, a piezoelectric element, a supporting member, etc. are arranged appropriately to complete a printer head.

The printing device of this embodiment has the periphery of the nozzle orifice coated with liquid-repellent polybenzimidazole. This arrangement ensures liquid-repellency at the periphery of the nozzle orifice, and thus allows stable ejection of ink and high-quality printing of documentary images. Moreover, using the polybenzimidazole, the printing device of this embodiment can be processed by abrasion with excimer laser, which will help simplify necessary processes and improve productivity.

For the printing device of this embodiment, as described above, other portions of the printer head (i.e. nozzle body and medium chambers), namely, the parts aside from the periphery of the nozzle orifice, can be made of a second polybenzimidazole material or polyimide.

The present invention, in another embodiment, provides an improved printing device constructed to eject a mixture of ink and diluent. The detailed description will now focus on such an embodiment of the present invention. Of such printing devices, one where ink is applied to a metering nozzle and diluent to an ejecting nozzle will be referred to as a printing device based on "carrier jet" mode, or a "carrier-jet printing device."

Figure 10:
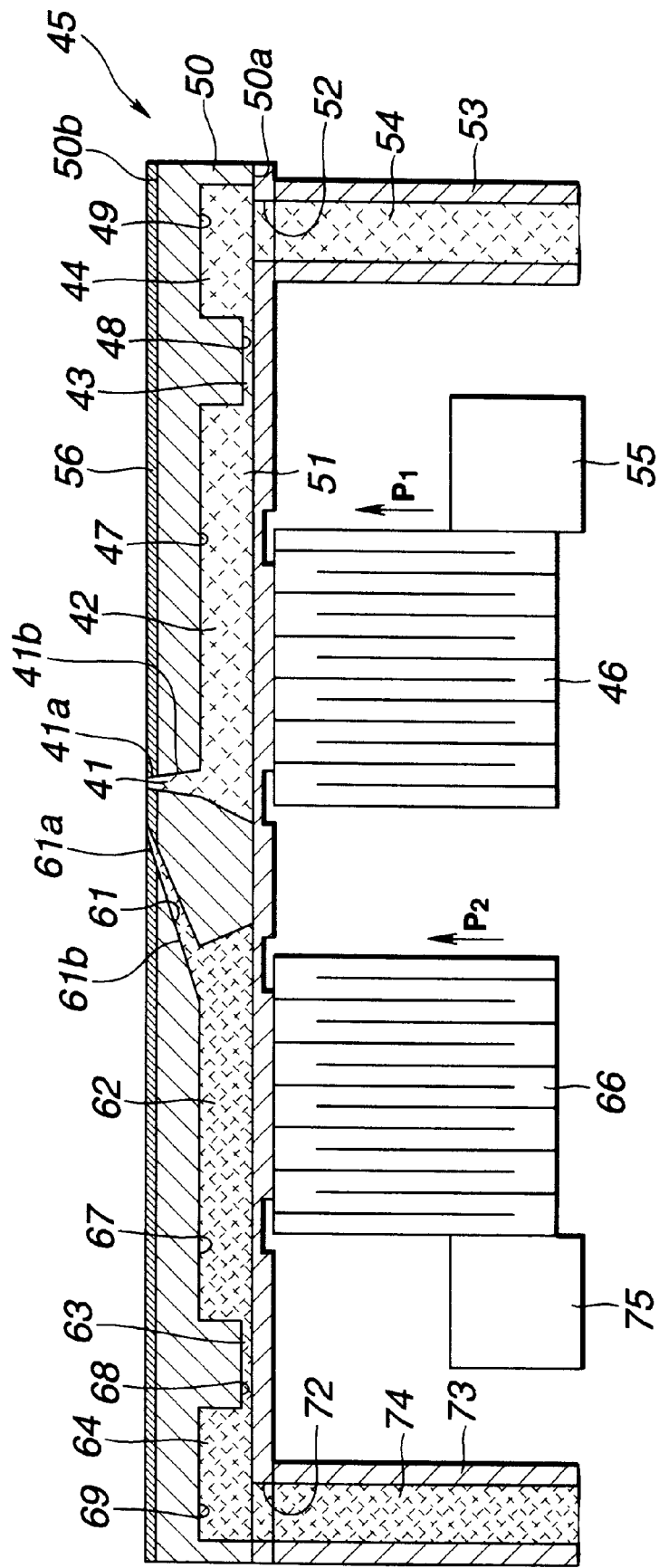
FIG. 10 is a schematic diagram of the cross-section of a second printing device according to this invention.

The printing device of this embodiment has a printing head composed, as illustrated in FIG. 10, mainly of an orifice plate member 45 including a first nozzle member 41, an ejecting medium chamber 42, an ejecting medium feed channel 43, and an ejecting medium feed aperture 44, and a second nozzle member 61, a metering medium chamber 62, a metering medium feed channel 63, and a metering medium feed aperture 64, and of first and second piezoelectric elements 46 and 66 placed opposite to the ejecting and metering medium chambers 42 and 62, respectively. Additionally, the printing device is also provided with a driving unit and a control unit (not shown).

Orifice plate 45 is composed of a base plate 50 provided with concave surfaces forming part of chambers and nozzles, and a vibrating plate 51 acting also as a lid covering such concave surfaces. The base plate 50 has a first concave surface 47 which forms part of the ejecting medium chamber 42, a second concave surface 48 shallower in its height than the first concave surface 47 and which forms part of the ejecting medium feed channel 43, and a third concave surface 49 deeper in its height than the second concave surface 48 and which forms part of the ejecting medium feed aperture 44. The surfaces are prepared in such a way that their open sides intercommunicate with each other and are flush with a main surface 50a. And, the surfaces have a passage formed from the first concave surface 47 up to a surface 50b, or a surface opposite to the surface 50a, that is, a hole penetrating through the thickness of the base plate 50 to make a first nozzle member 41 therefrom.

The base plate 50 further has a fourth concave surface 67 which forms part of the metering medium chamber 62, a fifth concave surface 68 shallower in its height than the fourth concave surface 67 and which forms part of the metering medium feed channel 63, and a sixth concave surface 69 deeper in its height than the fifth concave surface 68 and which forms part of the metering medium feed aperture 64. The surfaces are prepared in such a way that their open sides intercommunicate with each other and are flush with the main surface 50a. And, the surfaces have a passage formed from the fourth concave surface 67 up to the surface 50b, or the surface opposite to the surface 50a, that is, a hole penetrating through the thickness of the base plate 50 to make a second nozzle member 61 therefrom.

The first nozzle member 41, as identified herein, consists of a nozzle orifice 41a (outer portion) and a nozzle body 41b (inner portion). Likewise, the second nozzle member 61, as referenced herein, consists of a nozzle orifice 61a (outer portion) and a nozzle body 61b (inner portion). The first and second nozzle members 41 and 61, have their orifices placed adjacent to each other on the back surface 50b, and thus the ejecting medium and metering medium chambers 42 and 62, the ejecting medium and metering medium feed channels 43 and 63, and the ejecting medium and metering medium feed apertures 44 and 64 are arranged as if to surround the first and second nozzle members 41 and 61.

The above-mentioned concave surfaces can take, for example, a form whose cross-section is shaped like a U. Whereas, the first and second nozzle members 41 and 61 may take a conical form whose circular, ellipsoid, or rectangular base tapers to a tiny orifice at the back surface 50b to form a passage there.

A space formed between the third concave surface 49 and the vibrating plate 51 acts as an ejecting medium feed aperture 44. A second space formed between the second concave surface 48 and the vibrating plate 51 acts as an ejecting medium feed channel 43. The third space formed between the first concave surface 47 and the vibrating plate 51 acts as an ejecting medium chamber 42. Each of these spaces communicate with each other and form, together with the first nozzle member 41, a continuous passage for fluid.

An opening 52 is formed on the part of the vibrating plate 51 opposite to the third concave surface 49. To the opening 52 prepared at the ejecting medium feed aperture 44 is attached an ejecting medium feed pipe 53 to provide ejecting medium from an ejecting medium feed tank outside (not illustrated) to the printer head. Ejecting medium from the ejecting medium feed tank outside is supplied through the ejecting medium feed pipe 53 to the ejecting medium feed aperture 44. The ejecting medium then passes through the ejecting medium feed channel 43 to the ejecting medium chamber 42 and to the first nozzle member 41.

On the other side of the printing head, a space formed between the sixth concave surface 69 and the vibrating plate 51 acts as a metering medium feed aperture 64, a second space formed between the fifth concave surface 68 and the vibrating plate 51 acts as a metering medium feed channel 63, and a third space formed between the fourth concave surface 67 and the vibrating plate 51 acts as a metering medium chamber 62. Each of these spaces communicate with each other and form, together with the second nozzle member 61, a continuous passage for fluid.

An opening 72 is formed on the part of the vibrating plate 51 opposite to the sixth concave surface 69. To the opening 72 prepared at the metering medium feed aperture 64 is fitted a metering medium feed pipe 73 to provide metering medium from a metering medium feed tank outside (not illustrated) to the printer head. Metering medium from the metering medium feed tank outside is supplied through the metering medium feed pipe 73 to the metering medium feed aperture 64. The metering medium then passes through the metering medium feed channel 63 to the metering medium chamber 62 and to the second nozzle member 61. The vibrating plate 51 has thin grooves placed on its part so as to make its portions corresponding to the ejecting and metering medium chambers 42 and 62 ready to be displaced.

Laminated piezoelectric elements can be used as material appropriate for the piezoelectric elements 46 and 66. This embodiment incorporates such laminated piezoelectric elements. A first piezoelectric element 46, as described above, is placed on the part of the vibrating plate 51 which corresponds to the ejecting medium chamber 42 in such a manner that the long axis of the piezoelectric element 46 contacts the vibrating plate 51 at a right angle. The opposite end is fixed onto a supporting body 55. The second piezoelectric element 66 has a similar construction. It is placed on the part of the vibrating plate 51 which corresponds to the metering medium chamber 62, and its opposite end is fixed onto a supporting body 75.

The laminated piezoelectric elements composing the first and second pressuring elements 46 and 66 extend/contract in the direction of their long axis under the influence of voltages applied. As being stabilized at one end by supporting bodies 55 and 75, the piezoelectric elements 46 and 66, during extension, exert a pressure onto the vibrating plate 51 in the direction indicated with arrows $P_1$ and $P_2$ in FIG. 10. Thereby, ejecting medium 54 in the ejecting medium chamber 42 and metering medium 74 in the metering medium chamber 62 are pressurized, and ejecting medium 54 and metering medium 74 are pressed out from the nozzle members 41 and 61, respectively. During this operation, no measurable counter flow of ejecting and metering medium towards ejecting medium and metering medium feed apertures 54 and 74, respectively, will take place. This is because the ejecting and metering medium feed channels 43 and 63 are narrower than the respective chambers 42 and 62.

For the printing device of this embodiment, the second piezoelectric element 66 is first activated to exert a pressure on metering medium 74 in the volume constant medium chamber 62 to press out a specific volume of metering medium 74 from the second nozzle member 61 towards the first nozzle member 41, thereby transferring the metering medium adjacent to the orifice of the first nozzle member 41 to mix it with ejecting medium 54 there. The volume of metering medium pressed out from the chamber 62 can be varied according to the intensity or width of the voltage pulse applied onto the second piezoelectric element 66.

Then, the first piezoelectric element 46 is activated to exert a pressure on ejecting medium 54 in the ejecting medium chamber 42 to eject, together with the ejecting medium, the mixture comprising metering medium 74 and ejecting medium 54 stayed at the periphery of the nozzle orifice 41a towards a medium to be printed upon (not illustrated). The tone of a given image can be reproduced after the volume of metering medium 74 pressed out to be mixed with the ejecting medium is adjusted to give a concentration corresponding to the tone. Both the ejecting medium 54 and metering medium 74 can be either ink or diluent, and one takes ink then the other becomes diluent and vice versa. When ink is made the metering medium 74, the ink concentration of a given dot can be varied by changing the volume of ink to be contained in that dot; whereas, when a diluent is the metering medium 74, the ink concentration of a dot can be varied by changing the volume of the diluent to be contained in that dot.

Figure 11:
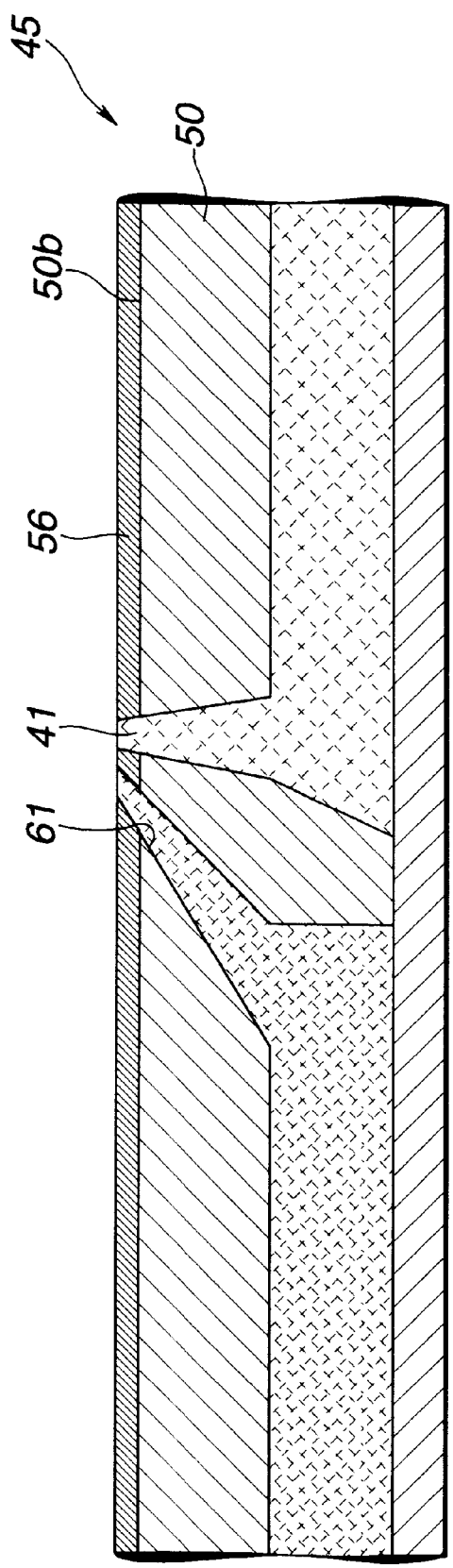
FIG. 11 is an enlarged view of a part of the second printing device according to this invention.

The printing head of the printing device of this embodiment, as further indicated in the enlarged cross-section in FIG. 11, has a liquid-repellent membrane 56. Membrane 56 is formed at least on the periphery of the first and second nozzle orifices 41a and 61a on the back surface 50b. As illustrated in FIG. 10, the liquid-repellent membrane 56 is formed all over the back surface 50b.

The liquid-repellent membrane 56 can preferably be made of polybenzimidazole. A variety of chemicals can be used for the polybenzimidazole. Preferably, chemicals having a structure as represented by the above Formula A are used. As described above, the polybenzimidazole preferably have a water-absorbing property of 4.0% or less, when left in an atmosphere of 76% RH for 24 hours. An example of a suitable polybenzimidazole is a PBI matrix resin solution, such as NPBI™ of cerazol painting grade available from Hoechst.

In the printing device of this embodiment, the base plate 50 can preferably be made of polyimide or a different kind of polybenzimidazole from the above-described one of Formula A. A variety of chemicals are appropriate polybenzimidazole to be used as a material of the base plate 50. Preferably, chemicals represented by the above Formula B are used for the base plate 50.

When the base plate 50 is made of polybenzimidazole as indicated above, it should be processed by a method at least comprising pressure molding, or by a method at least comprising injection molding. Suitable chemicals that may be used, for example, are U-60™ appropriate for pressure molding and TU-60™ appropriate for injection molding, both available from Hoechst.

When the base plate 50 is made of polybenzimidazole as described above, the liquid-repellent membrane 56 may be formed of a substance polymerizing at 150° C. or higher, as well as of polybenzimidazole. For example, polyimide polymers into which a fluorine polymer has been dispersed may be used as the liquid-repellant membrane 56. In an embodiment, the fluorine polymer is a copolymer of tetrafluoroethylene and hexafluoropropylene.

This printing device, in an embodiment, has the periphery of the first and second nozzle orifices 41a and 61a on the side of the printer head upon which the orifices are formed coated with liquid-repellent polybenzimidazole. This arrangement ensures liquid-repellency of at least the periphery of the first and second nozzle orifices 41a and 61a. With this example, therefore, ink and diluent are completely separated from each other during stand-by or before they are mixed. The mixing ratio of ink and diluent can be precisely adjusted dot by dot. Thus, the ink concentration can be accurately controlled in accordance with the tone of a given image to be reproduced. Accordingly, this printing device promotes high-resolution reproduction of documentary images. Moreover, the printing device of this embodiment, similarly to the above-described devices where only ink is ejected, allows stable ejection of ejecting medium, which further helps improve high-resolution reproduction of documentary images.

Figure 12:
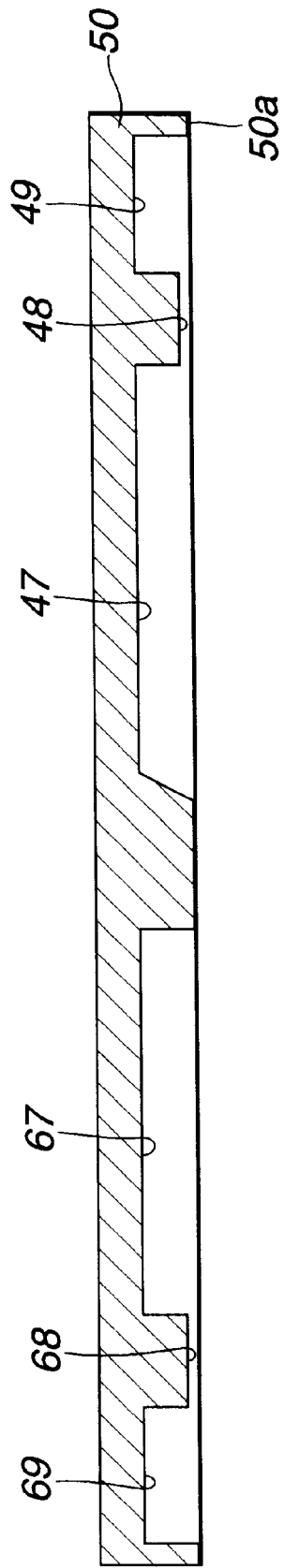
FIG. 12 is a schematic diagram of the cross-section of the printing device according to this invention illustrating the procedures of a third method used to produce the printer, particularly a procedure to prepare a base plate.

The present invention also provides a method for manufacturing such printing device having ejecting and metering chambers. The detailed description will now focus on a method for producing such a printer head. As illustrated in FIG. 12, a base plate 50 is so processed as to give a first concave surface 47, a second concave surface 48 and a third concave surface 49 which open towards a main surface 50a. The first concave section 47, second concave section 48 and third concave section 49 are so processed as to give a continuous passage, and their configuration is as described above. A fourth concave surface 67, a fifth concave surface 68 and a sixth concave surface 69 are also formed to give a continuous passage. Their configuration is as described above. The method appropriate for processing the base plate 50 includes injection molding or pressure molding. As indicated above, materials that may be utilized the base plate include polybenzimidazole and polyimide. However, the preferred material should include a different polybenzimidazole or polyimide material from the one used for the liquid-repellent membrane 56.

In an embodiment, polybenzimidazole or polyimide are used. The polybenzimidazole used for the base plate 50 should preferably have a structure as represented by the above Formula B. Suitable chemicals that may be used, as detailed previously, include U-60™ appropriate for pressure molding and TU-60™ appropriate for injection molding, both available from Hoechst. Such polybenzimidazole has a good wettability, is suitable for processing by abrasion with excimer laser, allows easy processing of nozzles, and prevents practically all entry of air bubbles into the nozzles. Any polyimide may be used for the base plate 50 as long as it has such a grade as to be applied for injection molding. An example of a suitable chemical is polyimide available from Mitsui Toatsu Chemicals.

Figure 13:
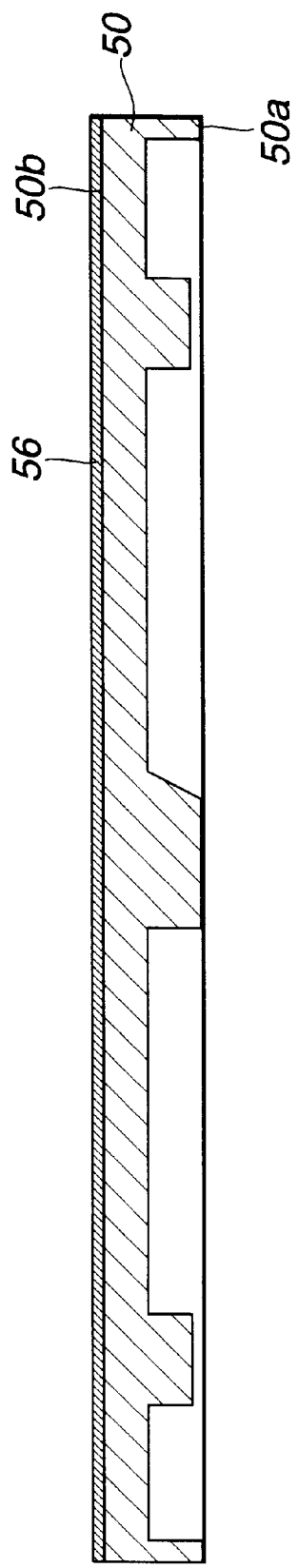
FIG. 13 is a schematic diagram of the cross-section of the printing device according to this invention illustrating a procedure to prepare a liquid-repellent membrane according to the third method of the present invention.

Then, as illustrated in FIG. 13, a liquid-repellent membrane 56 is formed on a back surface 50b or the surface opposite to the main surface 50a of the base plate 50. The liquid-repellent membrane 56 can preferably be made of such polybenzimidazole as has a structure as represented by the above Formula A. Such polybenzimidazole should also preferably have a water-absorbing property of 4.0% or less, when left in an atmosphere of 76% RH for 24 hours.

As previously detailed above, an example of a suitable polybenzimidazole is a PBI matrix resin solution, such as NPBI™ of cerazol painting grade available from Hoechst. This PBI matrix resin solution is a mixture that results after polybenzimidazole has been dispersed in an N,N-dimethylacetoamide solvent to give a 10 wt % resin solution, and is a liquid mass whose viscosity is 300±50 CP. The method to apply this mixture onto the base plate 50 may include coating by spraying, coating by dipping, and electrostatic coating followed by baking at 300° C. or higher for 30 minutes or longer. A liquid-repellent membrane, formed by the above method, shows no adhesiveness in a wide temperature range from room temperature to 200° C. Alternatively, a polybenzimidazole material, which satisfies the above requirements, is allowed to disperse in an N,N-dimethylacetoamide solvent to give a 10 wt % resin solution. The resulting mixture may be coated on the base plate 50 in the same way as above.

When a different polybenzimidazole or polyimide material from the one used for the liquid-repellent membrane 56 is used as a material for the base plate 50 as in this embodiment, a baking process requiring heating exceeding 300° C. or higher can be applied to the base plate. Such a process would be impossible if the base plate were made of polysulfone or polyethersulfone.

Figure 14:
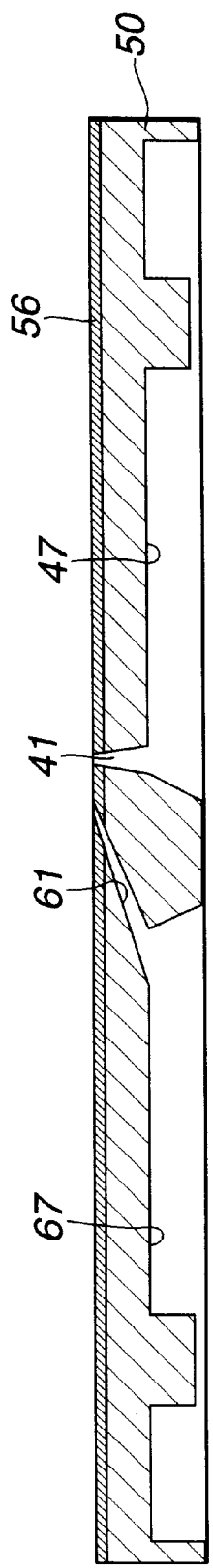
FIG. 14 is a schematic diagram of the cross-section of the printing device according to this invention illustrating a procedure to prepare nozzles according to the third method of the present invention.

Then, as illustrated in FIG. 14, a nozzle member 41 is formed with a laser processing machine which bores a hole penetrating from the bottom of the first concave surface 47 of the base plate 50 through the base plate 50 and the liquid-repellent membrane 56. In addition, another nozzle member 61 is formed with a laser processing machine which bores a hole penetrating from the bottom of the fourth concave surface 67 of the base plate 50 through the base plate 50 and the liquid-repellent membrane 56. With the printing device of this embodiment, a polybenzimidazole or polyimide material making the base plate 50 and a second polybenzimidazole material making the liquid-repellent membrane 56 both allow processing by abrasion with excimer laser, and thus, the first and second nozzle members 41 and 61 can be formed through processing by abrasion with excimer laser. Accordingly, the printing device of this embodiment, as with other embodiments, allows simplified processing of nozzles, which contributes to improvement of productivity. Moreover, the polybenzimidazole and polyimide can be so precisely processed by abrasion with excimer laser that the first and second nozzle members 41 and 61 are formed practically free from any flaws such as minute cracks and scales. This reduces failures during processing, contributes to improvement of net yield, and contributes to improvement of productivity.

Figure 15:
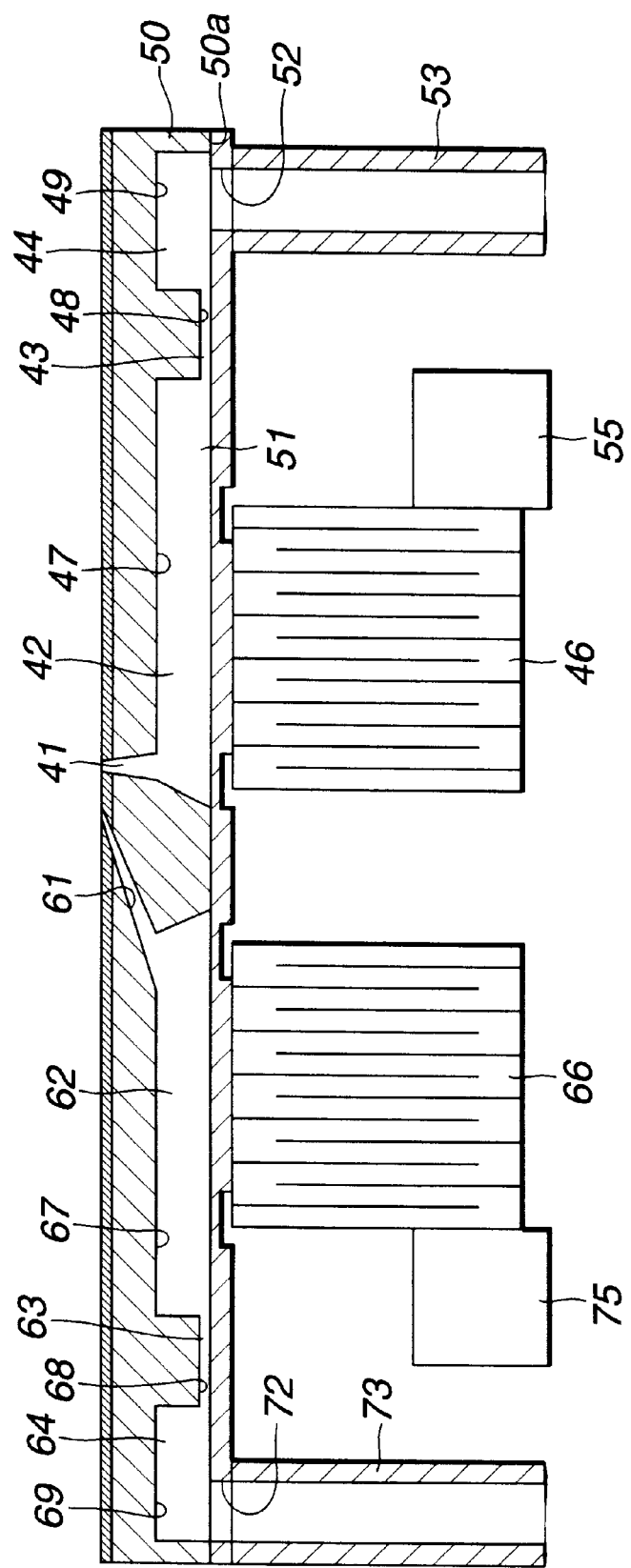
FIG. 15 is a schematic diagram of the cross-section of the printing device according to this invention illustrating a procedure to arrange a vibrating plate, etc., into a printer head according to the third method of the present invention.

Then, as shown in FIG. 15, a vibrating plate 51 to act also as a lid is placed on the main surface 50a. Thus, a space formed between the third concave surface 49 and the vibrating plate 51 creates an ejecting medium feed aperture 44, a second space formed between the second concave surface 48 and the vibrating plate 51 creates an ejecting medium feed channel 43, and a third space formed between the first concave surface 47 and the vibrating plate 51 creates an ejecting medium chamber 42. These spaces communicate with each other and form, together with the first nozzle member 41, a continuous passage for fluid. An opening 52 is formed on part of the vibrating plate 51 opposite to the third concave surface 49, and that opening communicates with part of the ejecting medium feed aperture 44.

Additionally, the vibrating plate 51 is arranged such that a space formed between the sixth concave surface 69 and the vibrating plate 51 creates a metering medium feed aperture 61, a second space formed between the fifth concave surface 68 and the vibrating plate 51 creates a metering medium feed channel 63, and a third space formed between the first concave surface 67 and the vibrating plate 51 creates a metering medium chamber 62. These spaces communicate with each other and form, together with the second nozzle member 61, a continuous passage for fluid. An opening 72 is formed on the part of the vibrating plate 51 opposite to the sixth concave surface 69, and that opening communicates with part of the metering medium feed aperture 64. The vibrating plate 51 has thin grooves placed on its part so as to make its portions corresponding to the ejecting and metering chambers 42 and 62 ready to be displaced.

A piezoelectric element 46 composed of laminated piezoelectric elements is placed on the part of vibrating plate 51 corresponding to the ejecting medium chamber 42. Likewise, another piezoelectric element 66 composed of laminated piezoelectric elements is placed on the part of the vibrating plate 51 corresponding to the metering medium chamber 62. These piezoelectric elements 46 and 66 are supported by supporting bodies 55 and 75. Lastly, an ejecting medium feed pipe 53 is connected to the opening 52 and a metering medium feed pipe 73 to the opening 72, thereby to complete a printer head.

Figure 16:
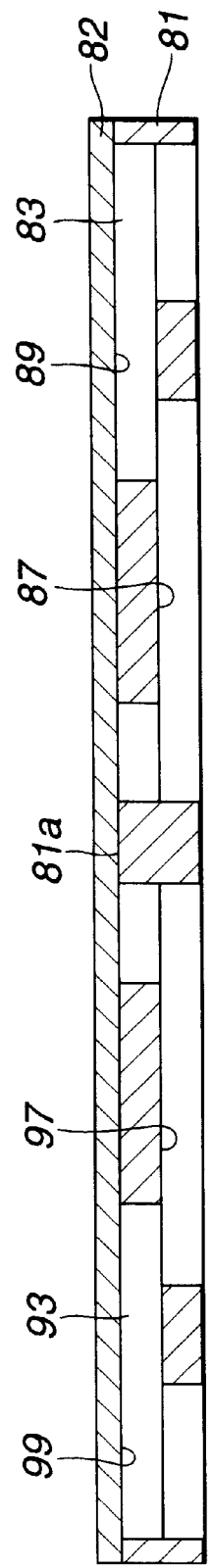
FIG. 16 is a schematic diagram of the cross-section of the printing device according to this invention illustrating the procedures of a fourth method used to produce the printer, particularly a procedure to prepare a metal plate with a polymer film bonded thereupon.

In the above embodiment, the base plate 50 has concavities formed according to a predetermined design through a processing means such as injection molding. Alternatively, the base plate 50, instead of being formed as above, can be prepared by bonding a polymer film made of polyimide or the like onto a metal plate. When such metal plate is used, it should have a slightly different structure. As illustrated in FIG. 16, a polymer film 82 is bonded onto the main surface 81a of a metal plate 81, whereby a first concave surface 87 to form part of an ejecting medium chamber, a third concave surface 89 to form part of an ejecting medium feed aperture, and an ink feed channel 83 to connect between the first concave surface 87 and the third concave surface 89 are produced. In addition, a fourth concave surface 97 to form part of a metering medium chamber, a sixth concave surface 99 to form part of a metering medium feed aperture, and a metering medium feed channel 93 to connect between the fourth concave surface 97 and the sixth concave surface 99 are prepared. This assembly acts as a base plate.

Such metal plate 81 may be made of, for example, stainless steel, and the polymer film 82 may be made of polyimide or the like. If the film is made of polyimide, it should have more wettability because a hole to act as a nozzle is bored through this film. Further, the film should be amenable to processing by abrasion with excimer laser. As such polyimide film for example, Capton film™ available from Toray-Dupont can be used. Further the film should be preferably bonded onto the metal plate by having a coating type polyimide material with a low glass transition temperature inserted between itself and the metal plate. As such polyimide material, for example, Neoflex™ (glass transition temperature being 200° C.) available from Mitsui Toatsu Chemicals can be used.

The polymer film 82 may be also be made of polybenzimidazole having a structure as represented by the above Formula B. Such polymer film can be produced after the polybenzimidazole has been processed into a film or a very thin plate.

The base plate composed of a metal plate 81 and a polymer film 82 having a construction as described above is as strong in resistance to chemical abrasion as the aforementioned base plate made of a single material.

Figure 17:
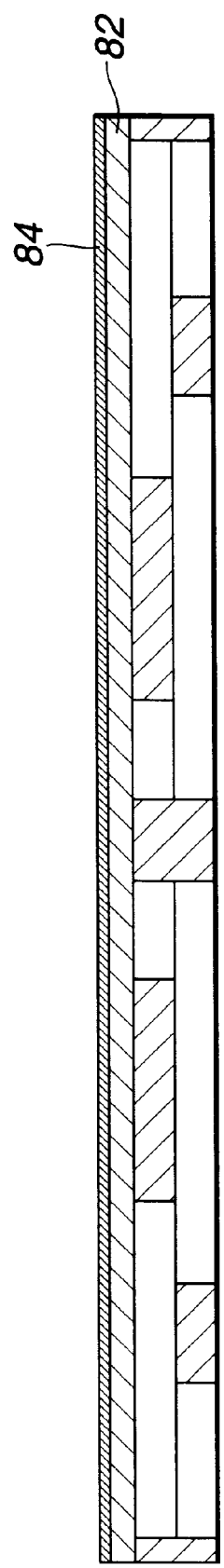
FIG. 17 is a schematic diagram of the cross-section of the printing device according to this invention illustrating a procedure to prepare a liquid-repellent membrane according to the fourth method.

Next, as illustrated in FIG. 17, a liquid-repellent membrane 84 is formed upon the polymer film 82. The liquid-repellent membrane 84 can preferably be made of such polybenzimidazole having a structure as represented by the above Formula A. Such polybenzimidazole preferably has a water-absorbing property of 4.0% or less, when left in an atmosphere of 76% RH for 24 hours. To form the liquid-repellant membrane 84 made of such polybenzimidazole, the polybenzimidazole can be coated onto the polymer film.

Similar to that detailed above with respect to FIG. 8, an example of a suitable polybenzimidazole is a PBI matrix resin solution, such as NPBI™ of cerazol painting grade available from Hoechst. This PBI matrix resin solution, such as the NPBI™ provided by Hoechst, is a mixture that results after polybenzimidazole has been dispersed in an N,N-dimethylacetoamide solvent to give a 10 wt % resin solution, and is a liquid mass whose viscosity is 300±50 CP.

The method to apply this mixture onto the polymer film 82 may include coating by spraying, coating by dipping, and electrostatic coating followed by baking at 300° C. or higher for 30 minutes or longer. A liquid-repellent membrane 84, formed by this method, shows no adhesiveness in a wide temperature range from room temperature to 200° C. Alternatively, a polybenzimidazole material, which satisfies the above requirements, is allowed to disperse in an N,N-dimethylacetoamide solvent to give a 10 wt % resin solution. The resulting mixture may then be used as a coat on the polymer film 84 in the same way as above.

When a different polybenzimidazole or polyimide material from the one used for the liquid-repellent membrane 84 is used as a material for the polymer film 82 as in this embodiment, a baking process requiring heating exceeding 300° C. or higher can be applied to the polymer film 82, which would be impossible if the polymer film 82 were made of polysulfone or polyethersulfone.

Figure 18:
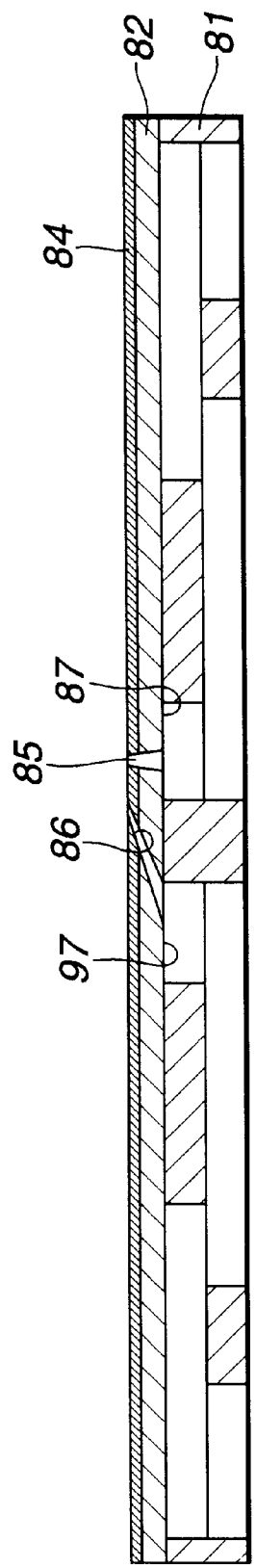
FIG. 18 is a schematic diagram of the cross-section of the printing device according to this invention illustrating a procedure to prepare nozzles according to the fourth method of the present invention.

Then, as illustrated in FIG. 18, a first nozzle member 85 is formed with a laser processing machine which bores a hole penetrating from the bottom of the first concave surface 87 of the metal plate 81 through the polymer film 82 and the liquid-repellant membrane 84. In addition, a second nozzle member 86 is formed with a laser processing machine which bores a hole penetrating from the bottom of the fourth concave surface 97 of the metal plate 81 through the polymer film 82 and the liquid repellant membrane 84.

With the printing device of this embodiment, a polybenzimidazole or polyimide material making the polymer film 82 and a second polybenzimidazole material making the liquid-repellent membrane 84 both allow processing by abrasion with excimer laser, and thus, the first and second nozzles members 85 and 86 can be formed through processing by abrasion with excimer laser. Accordingly, the printing device of this embodiment, similar to the embodiments detailed above, allows simplified processing of nozzles, which contributes to improvement of productivity. Moreover, polybenzimidazole and polyimide can be so precisely processed by abrasion with excimer laser that the first and second nozzle members 85 and 86 are formed practically free from any flaws such as minute cracks and scales. This reduces failures during processing, contributes to improvement of net yield, and contributes to improvement of productivity.

Then, similarly as described earlier, a vibrating plate, an ejecting medium feed pipe, a metering feed pipe, piezoelectric elements, etc. are arranged appropriately to complete a printer head.

This printing device, in an embodiment, has the periphery of the nozzle orifices coated with liquid-repellent polybenzimidazole. This ensures thereby liquid-repellency of at least the periphery of the nozzle orifices. With this embodiment therefore, ink and diluent are completely separated from each other during stand-by or before they are mixed. The mixing ratio of ink and diluent can be precisely adjusted dot by dot. Thus, the ink concentration can be accurately controlled in accordance with the tone of a given image to be reproduced. Accordingly, this printing device can allow high-resolution printing of documentary images. Moreover, the printing device of this embodiment ensures stable ejection of ejecting medium, which alone may help improve high-resolution reproduction of documentary images.

With the printing device of this embodiment, above polybenzimidazole allows processing by abrasion with excimer laser, and thus, the nozzles can be formed by abrasion with excimer laser. Alternatively, the printing devices can be prepared by abrasion with excimer laser combined with pressure molding and injection molding. Accordingly, the printing device of this embodiment can be produced by simple procedures, which will result in improved productivity.

Figure 19:
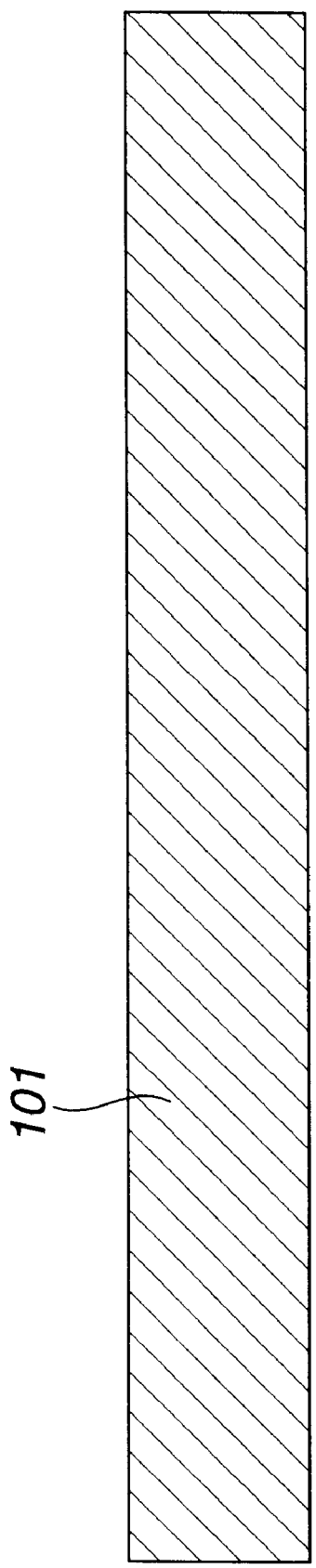
FIG. 19 is a schematic diagram of the cross-section of the printing device according to this invention illustrating the procedures of a fifth method used to produce the printer, particularly a procedure to prepare a base material.

The method by which to manufacture the above described printing devices where only ink is ejected may include, for example, the following methods. The description will first focus on an example in which a nozzle is formed by abrasion with excimer laser combined with pressure molding. First, as is illustrated in FIG. 19, a plate base material 101, which is composed of polybenzimidazole amenable to processing by abrasion with excimer laser and having a structure as represented by the above Formula B, such as U-60™ available from Hoechst, is prepared.

Figure 20:
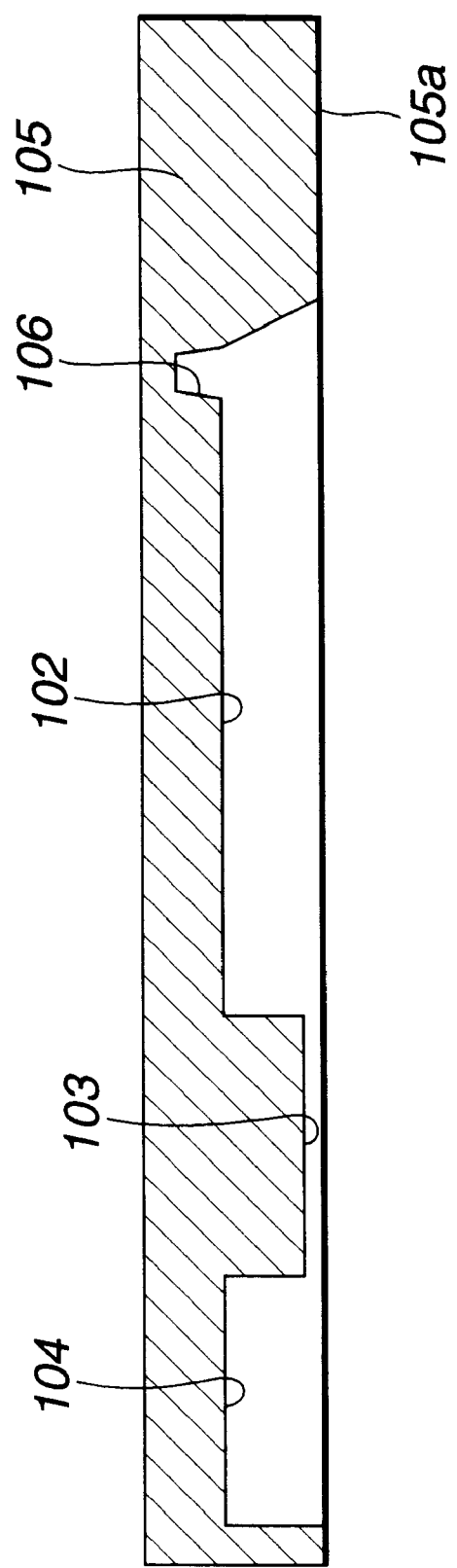
FIG. 20 is a schematic diagram of the cross-section of the printing device according to this invention illustrating the procedures of a fifth method used to produce the printer, particularly a procedure to prepare a base plate.
Figure 21:
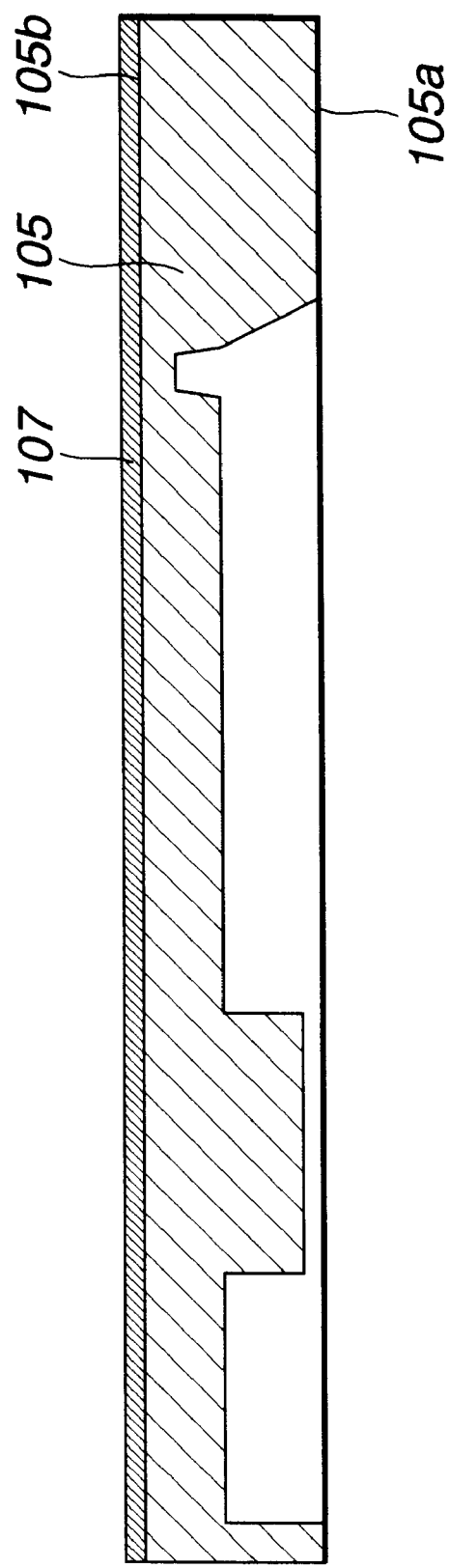
FIG. 21 is a schematic diagram of the cross-section of the printing device according to this invention illustrating a procedure to prepare a liquid-repellent membrane according to the fifth method of the present invention of the present invention.

Then, this base material 101 is put into a pressure mold die for pressure molding. This results in the formation of a base plate 105 which has, as illustrated in FIG. 20, a first concave surface 102, a second concave surface 103, and a third concave surface 104 formed such that their mouths open towards the main surface 105a. These concave surfaces communicate with each other and their configuration is as described above. In this example, during the pressure molding, a nozzle conduit 106 is formed as a blind hole in the substance of the base plate 105 from the bottom of the first concave surface 102. Then, as illustrated in FIG. 21, a liquid-repellent membrane 107 is formed upon the back surface 105b or a surface opposite to the main surface 105a of the base plate 105.

In the above examples, the liquid-repellent membrane is made of polybenzimidazole. When the base plate 105 as in this embodiment is made of polybenzimidazole, such as U-60™ by Hoechst, the range of materials to be used for the liquid-repellent membrane 107 will broaden greatly. This is because such a commercial polybenzimidazole has a thermal resistance exceeding 400° C.

Specifically, the material to be used for the liquid-repellent membrane 107 can include materials which polymerize at 150° C. or higher, or polyimide polymers in which a fluorine polymer has been dispersed. Examples appropriate for the liquid-repellent membrane 107 may include polybenzimidazole, Yupicoat FS-100L™ or a polyimide overcoating ink provided by Ube Industries, and Yupifine FP-100™ or a polyimide coating material by the same manufacturer, whose water absorbance is 0.4% or less. Further, it may include modified polytetrafluoroethylene coating 958-207™ manufactured by DuPont, or a compound which results by dispersing polytetrafluoroethylene particles into a polyimide material. These compounds are all particularly amenable to processing by abrasion with excimer laser.

The liquid-repellent membrane 107 may be so processed as to give a thickness of 10–30 μm. The membrane should preferably have a thickness of 5 μm or more, because then it will scarcely develop pin holes.

Provided that the construction of the nozzle does not require much precision, or in other words, that the nozzle may be inflicted with more or less minor flaws, or that the liquid-repellent membrane may have a thickness of 5 μm or less, a polytetrafluoroethylene can be used as a material of the liquid-repellent membrane.

Figure 22:
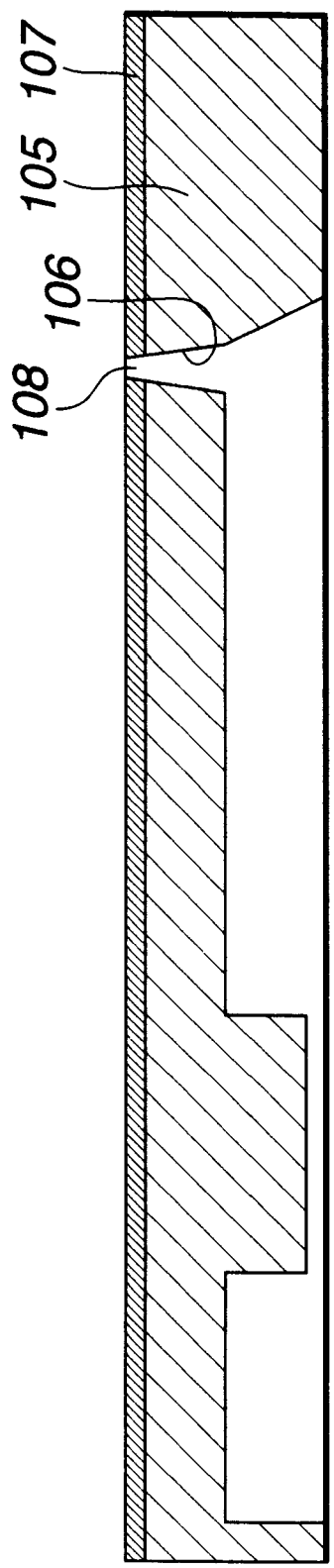
FIG. 22 is a schematic diagram of the cross-section of the printing device according to this invention illustrating a procedure to prepare a nozzle according to the fifth method of the present invention.

Then, as illustrated in FIG. 22, a nozzle orifice taper 108 is formed with a laser processing machine which bores a hole penetrating from the bottom of the nozzle conduit 106 of the base plate 105 through the base plate 105 and the liquid-repellent membrane 107. With the printing device of this embodiment, a polybenzimidazole material making the base plate 105 and a second polybenzimidazole material making the liquid-repellent membrane 107 both allow processing by abrasion with excimer laser, and thus, the nozzle orifice taper 180 can be formed by abrasion with excimer laser.

Then, a vibrating plate is applied in the same manner as described above to complete the present printing device. In this example, the range of materials to be used for bonding will broaden greatly, because the temperature of about 200° C. developed during the process necessary for bonding of the vibrating plate does not pose any problem. Formation of nozzles by this method, therefore, will lead to a lowering of production cost and improved productivity, because processing by abrasion with excimer laser can be minimized.

Next, the description will focus on an example in which a nozzle is formed by abrasion with excimer laser combined with injection molding. First, a polybenzimidazole material amenable to processing by abrasion with excimer laser and having a structure as represented by the above Formula B, such as TU-60™ by Hoechst, is prepared. This material is put into an injection mold die (not illustrated) for injection molding.

As a result, this base material gives a base plate 105 which has, as illustrated in FIG. 20, a first concave surface 102, a second concave surface 103, and a third concave surface 104 formed such that their mouths open towards the main surface 105a. These concave surfaces, in the same manner as above, communicate with each other and their configuration is the same as above. In this example, during the injection molding, a nozzle conduit 106 is formed as a blind hole in the substance of the base plate 105 from the bottom of the first concave surface 102. Then, as illustrated in FIG. 21, a liquid-repellent membrane 107 is formed upon the back surface 105b or a surface opposite to the main surface 105a of the base plate 105.

As indicated above, in the above examples, the liquid-repellent membrane is made of polybenzimidazole. When the base plate 105 in this embodiment is made of polybenzimidazole, such as TU-60™ available from Hoechst, the range of materials to be used for the liquid-repellent membrane 107 will broaden greatly, because such a commercial polybenzimidazole has a thermal resistance exceeding 250° C.

Specifically, in this embodiment, the material to be used for the liquid-repellent membrane 107 can include materials which polymerize at 150° C. or higher, or polyimide polymers in which a fluorine polymer has been dispersed. Examples appropriate for the liquid-repellent membrane 107 may include, polybenzimidazole, Yupicoat FS-100™ or a polyimide overcoating ink provided by Ube Industries, and Yupifine FP-100™ or a polyimide coating material by the same manufacturer, both of which have a water absorbance of less than 0.4% or less. Further, it may include modified polytetrafluoroethylene coating 958-207™ by DuPont, or a compound which results by dispersing polytetrafluoroethylene particles into a polyimide material. These compounds are all particularly amenable to processing by abrasion with excimer laser.

Of the materials mentioned above, polybenzimidazole requires a polymerization process developing a temperature of 300° C. or higher. Even the process requiring such a high temperature, however, will not inflict any noticeable damage to the base plate 105, because the polybenzimidazole in question is very close in its basic composition to the polybenzimidazole composing the base plate 105. Further, the compound which results after having dispersed polytetrafluoroethylene particles into a polyimide material requires a polymerization process involving heating to a temperature of about 340° C. This process will not inflict damage to the base plate 105 either, because this process requires only a short period, and the temperature the base plate will be exposed to during the process will not exceed the thermal resistance limit of the plate by 100° C. or higher.

The liquid-repellent membrane 107 may be so processed as to give, for example, a thickness of 10–30 $\mu$m. The membrane should preferably have a thickness of 5 $\mu$m or more, because then it will scarcely develop pin holes.

Provided that the construction of the nozzle does not require much precision, or in other words, that the nozzle may be inflicted more or less with minor flaws, or that the liquid-repellent membrane may have a thickness of 5 $\mu$m or less, a polytetrafluoroethylene can be used as a material of the liquid-repellent membrane.

Then, as illustrated in FIG. 22, a nozzle orifice taper 108 is formed with a laser processing machine which bores a hole penetrating from the bottom of the nozzle conduit 106 of the base plate 105 through the base plate 105 and the liquid-repellent membrane 107. With the printing device of this example, a polybenzimidazole material making the base plate 105 and a material making the liquid-repellent membrane 107 both allow processing by abrasion with excimer laser, and thus, the nozzle orifice taper 180 can be formed by abrasion with excimer laser.

Then, a vibrating plate is applied in the same manner as described above to complete the present printing device. In this example, the range of materials to be used for bonding will broaden greatly, because the base plate 105 is made of a polybenzimidazole material having a high thermal resistance, and the temperature of about 200° C. developed during the process necessary for bonding of the vibrating plate does not pose any problem. Formation of nozzles by this method, therefore, will lead to a lowering of production cost and improved productivity, because processing by abrasion with excimer laser can be minimized.

Figure 23:
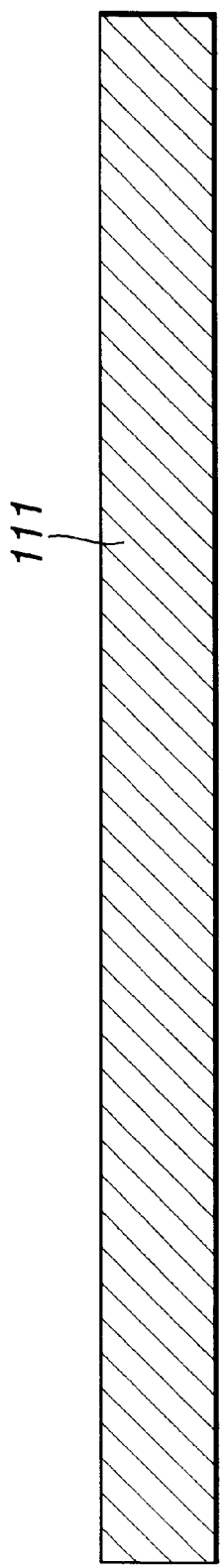
FIG. 23 is a schematic diagram of the cross-section of the printing device according to this invention illustrating the procedures of a sixth method used to produce the printer, particularly a procedure to prepare a base material.

The method by which to manufacture the above described printing devices where ink and diluent are ejected while being mixed together may include, for example, the following methods. The description will first focus on an example in which nozzles are formed by abrasion with excimer laser combined with pressure molding. As is illustrated in FIG. 23, a base plate material 111 which is composed of polybenzimidazole amenable to processing by abrasion with excimer laser and having a structure as represented by the above Formula B, such as U-60™ by Hoechst, is first prepared.

Figure 24:
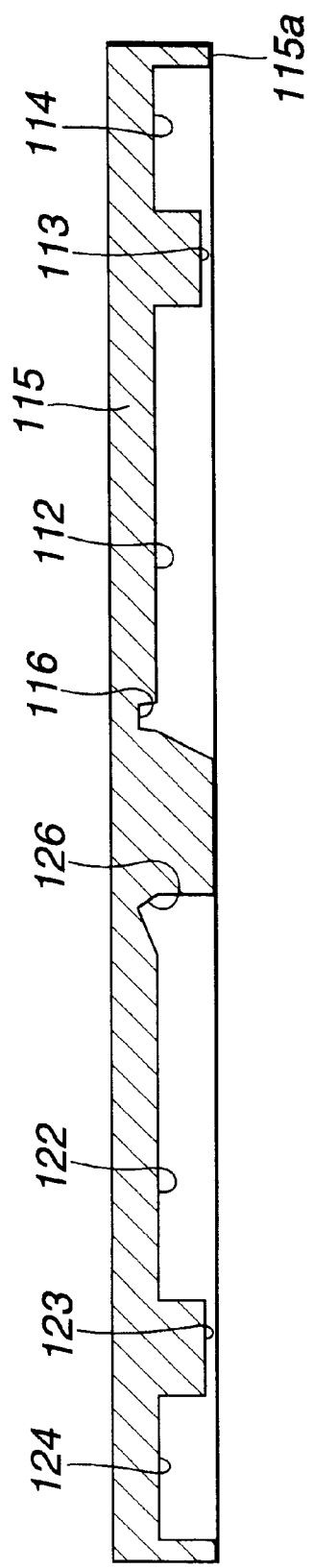
FIG. 24 is a schematic diagram of the cross-section of the printing device according to this invention illustrating the procedures of a sixth method used to produce the printer, particularly a procedure to prepare a base plate.
Figure 25:
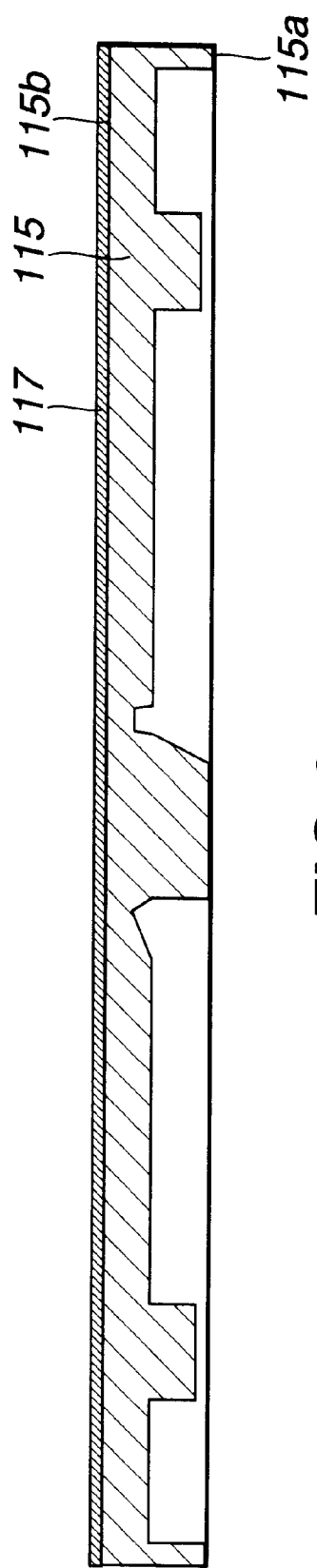
FIG. 25 is a schematic diagram of the cross-section of the printing device according to this invention illustrating a procedure to prepare a liquid-repellent membrane according to the sixth method of the present invention.

Then, this base material 111 is put into a pressure mold die for pressure molding. This results in the formation of a base plate 115 which has, as illustrated in FIG. 24, a first concave surface 112, a second concave surface 113, and a third concave surface 114 formed such that their mouths open towards the main surface 115a. Likewise, the pressure mold creates a fourth concave surface 122, a fifth concave surface 123, and a sixth concave surface 124 formed such that their mouths open towards the main surface 115a. Those concave surfaces communicate with each other and their configuration is as described above. In this example, during the pressure molding, a nozzle conduit 116 is formed as a blind hole in the substance of the base plate 115 from the bottom of the first concave surface 112, while a second nozzle conduit 126 is formed as a blind hole obliquely directed to the thickness of the base plate 115 from the bottom of the fourth concave surface 122. Then, as illustrated in FIG. 25, a liquid-repellent membrane 117 is formed upon the back surface 115b or a surface opposite to the main surface 115a of the base plate 115.

As previously described with respect to the other embodiments, the liquid-repellent membrane is made of polybenzimidazole. However, when the base plate 115 in this embodiment is made of polybenzimidazole, such as U-60™ by Hoechst, the range of materials to be used for the liquid-repellent membrane 117 will broaden greatly, because such a commercial polybenzimidazole has a thermal resistance exceeding 400° C.

Specifically, the material to be used for the liquid-repellent membrane 117 can include materials which polymerize at 150° C. or higher, or polyimide polymers in which a fluorine polymer has been dispersed. Examples appropriate for the liquid-repellent membrane 117 may include polybenzimidazole, Yupicoat FS-100L™ or a polyimide overcoating ink provided by Ube Industries, and Yupifine FP-100™ or a polyimide coating material by the same manufacturer, both of which have a water absorbance of less than 0.4% or less. Further, it may include modified polytetrafluoroethylene coating 958-207™ by DuPont, or a compound which results by dispersing polytetrafluoroethylene particles into a polyimide material. These compounds are all particularly amenable to processing by abrasion with excimer laser.

The liquid-repellent membrane 117 may be so processed as to give, for example, a thickness of 10–30 $\mu$m. The membrane should preferably have a thickness of 5 $\mu$m or more, because then it will scarcely develop pin holes.

Provided that the construction of the nozzle does not require much precision, or in other words, that the nozzle may be inflicted with more minor flaws, or that the liquid-repellent membrane may have a thickness of 5 $\mu$m or less, a polytetrafluoroethylene can be used as a material of the liquid-repellent membrane.

Figure 26:
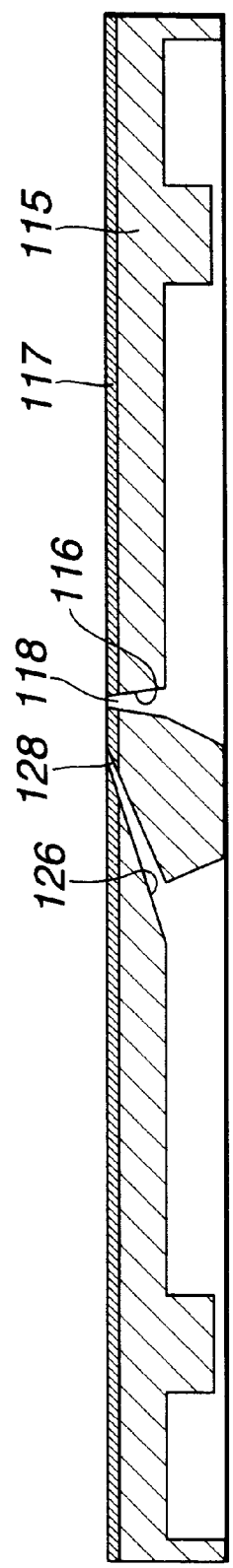
FIG. 26 is a schematic diagram of the cross-section of the printing device according to this invention illustrating a procedure to prepare nozzles according to the sixth method of the present invention.

Then, as illustrated in FIG. 26, with a laser processing machine a first nozzle orifice taper 118 is formed as a hole penetrating from the bottom of the first nozzle conduit 116 of the base plate 115 through the base plate 115 and the liquid-repellent membrane 117. Likewise, a second nozzle orifice taper 128 is formed as a hole from the bottom of the second nozzle conduit 126 obliquely directed to the thickness of the base plate 115 and penetrating the base plate 115 and the liquid-repellent membrane 117. With the printing device of this embodiment, a polybenzimidazole material making the base plate 105 and a material making the liquid-repellent membrane 107 both allow processing by abrasion with excimer laser, and thus, the nozzle orifice tapers 118 and 128 can be formed by abrasion with excimer laser.

Then, a vibrating plate is applied in the same manner as described above to complete the present printing device. In this embodiment, the range of materials to be used for bonding will broaden greatly, because the base plate 115 is made of a polybenzimidazole material having a high thermal resistance, and the temperature about 200° C. developed during the process necessary for bonding of the vibrating plate does not pose any problem. Formation of nozzles by this method, therefore, will lead to a lowering of production cost and improved productivity, because processing by abrasion with excimer laser can be minimized.

Next, the description will focus on an example in which nozzles are formed by abrasion with excimer laser combined with injection molding. First, a polybenzimidazole material amenable to processing by abrasion with excimer laser and having a structure as represented by the above Formula B, such as TU-60™ by Hoechst is prepared. This material is put into an injection mold die (not illustrated) for injection molding.

As a result, this base material gives a base plate 115 which has, as illustrated in FIG. 24, a first concave surface 112, a second concave surface 113, and a third concave surface 114 formed such that their mouths open towards the main surface 115a. Additionally, the injection mold creates a fourth concave surface 122, a fifth concave surface 123, and a sixth concave surface 124 also formed such that their mouths open towards the main surface 115a. These concave surfaces, in the same manner as above, communicate with each other and their configuration is the same as above. In this embodiment, during the pressure molding, a nozzle conduit 116 is formed as a blind hole in the substance of the base plate 115 from the bottom of the first concave surface 112, while a second nozzle conduit 126 is formed as a blind hole obliquely directed to the thickness of the base plate 115 from the bottom of the fourth concave surface 122. Then, as illustrated in FIG. 25, a liquid-repellent membrane 117 is formed upon the back surface 115b or a surface opposite to the main surface 115a of the base plate 115.

In this embodiment, the liquid-repellent membrane is made of polybenzimidazole. However, when the base plate 115 in this embodiment is made of polybenzimidazole, such as TU-60™ by Hoechst, the range of materials to be used for the liquid-repellent membrane 117 will broaden greatly, because that polybenzimidazole has a thermal resistance exceeding 250° C.

Specifically, the material to be used for the liquid-repellent membrane 117 can include materials which polymerize at 150° C. or higher, or polyimide polymers in which a fluorine polymer has been dispersed. Examples appropriate for the liquid-repellent membrane 117 may include, polybenzimidazole, Yupicoat FS-100™ or a polyimide overcoating ink provided by Ube Industries, and Yupifine FP-100™ or a polyimide coating material by the same manufacturer, both of which have a water absorbance of less than 0.4%. Further, it may include modified polytetrafluoroethylene coating 958-20™ by DuPont, or a compound which results by dispersing polytetrafluoroethylene particles into a polyimide material. These compounds are all particularly amenable to processing by abrasion with excimer laser.

Of the materials mentioned above, the polybenzimidazole requires a polymerization process developing a temperature of 300° C. or higher. Even the process requiring such a high temperature, however, will not inflict any noticeable damage to the base plate 115, because the polybenzimidazole in question is very close in its basic composition to the polybenzimidazole composing the base plate 115. Further, the compound which results after having dispersed polytetrafluoroethylene particles into a polyimide material requires a polymerization process involving heating to a temperature about 340° C. This process will not inflict damage to the base plate 115 neither, because this process requires only a short period, and the temperature to which the base plate will be exposed during the process will not exceed the thermal resistance limit of the plate by 100° C. or higher.

The liquid-repellent membrane 117 may be so processed as to give, for example, a thickness of 10–30 μm. The membrane should preferably have a thickness of 5 μm or more, because then it will scarcely develop pin holes.

Provided that the construction of the nozzle does not require much precision, or in other words, that the nozzle may be inflicted with more or less minor flaws, or that the liquid-repellent membrane may have a thickness of 5 μm or less, PTFE (a tetrafluoroethylene resin) can be used as a material of the liquid-repellent membrane.

Then, as illustrated in FIG. 26, with a laser processing machine a first nozzle orifice taper 118 is formed as a hole penetrating from the bottom of the first nozzle conduit 116 of the base plate 115 through the base plate 115 and the liquid-repellent membrane 117. Likewise, a second nozzle orifice taper 128 is formed as a hole from the bottom of the second nozzle conduit 126 obliquely directed to the thickness of the base plate 115 and penetrating the base plate 115 and the liquid-repellent membrane 117. With the printing device of this embodiment, a polybenzimidazole material making the base plate 105 and a material making the liquid-repellent membrane 117 both allow processing by abrasion with excimer laser, and thus, the nozzle orifice tapers 118 and 128 can be formed by abrasion with excimer laser.

Then, a vibrating plate is applied in the same manner as described above to complete the present printing device. In this embodiment, the range of materials to be used for bonding will broaden greatly, because the base plate 115 is made of a polybenzimidazole material having a high thermal resistance, and the temperature of about 200° C. developed during the process necessary for bonding of the vibrating plate does not pose any problem. Formation of nozzles by this method, therefore, will lead to a lowering of production cost and improved productivity, because processing by abrasion with excimer laser can be minimized.

Of course, with the printing devices described above which have been produced by the method comprising abrasion with excimer laser combined with pressure molding or injection molding, the same effects can be obtained as those characteristic to the printing devices mentioned earlier.

Further, in this invention, the liquid-repellent membranes 16, 26, 56, 84, 107 and 117 shown in FIGS. 2, 8, 11, 17, 21 and 25, respectively, can be constituted by a polyimide polymer in which a fluorine polymer is dispersed. The fluorine polymer may include various chemicals, but preferably includes a copolymer of tetrafluoroethylene and hexafluoroethylene or the like which have a structure as represented by the following Formula C.

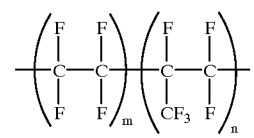

where m and n are mole percentages, m being a positive integer from 1 to 99 and n being a positive integer from 99 to 1. Preferably, the fluorine polymer has a molecular weight of about 5,000 to 500,000.

The polyimide polymer may have a property to polymerize when heated to 300° C. or higher. An example of a suitable fluorine polymer that meets such requirements as above is Teflon® coating 958-207 available from DuPont.

Moreover, the polyimide polymer, besides those mentioned above, may include various chemicals including aromatic polyimides. It may include further the compounds which have a structure as represented by the following Formula D and Formula E.

[Formula D]

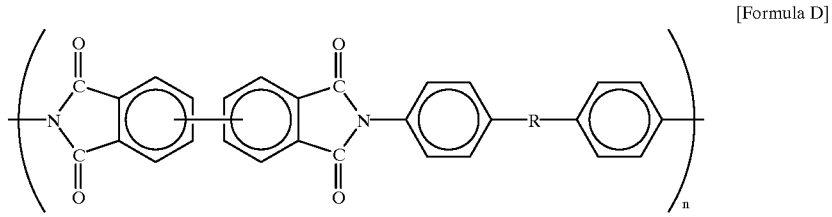

where n represents a positive integer, and R is a divalent bridging unit. For example, R can be any of the following: O, CO, $CH_2$, $C_2H_4$.

[Formula E]

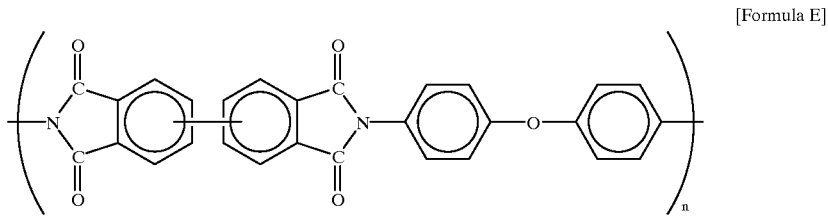

where n represents a positive integer. The polyimide polymers of Formulas D and E preferably have a molecular weight of about 5,000 to 1,000,000.

Such polyimide polymers preferably have a water absorbance of 0.4% or less when kept in water of 23° C. for 24 hours. Such polyimide polymers may further have a property to polymerize when heated to 180° C. or lower.

In an embodiment, the polyimide polymer may include polyimidesiloxane. The polyimidesiloxane preferably has a structure as represented by the following Formula F and Formula G.

[Formula F]

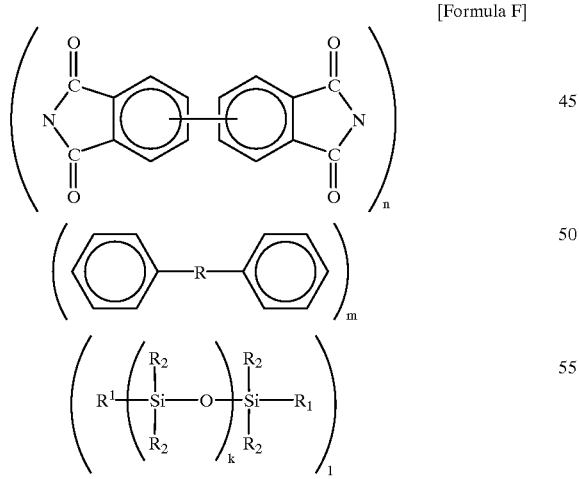

where k, l, m and n represent positive integers, R is a divalent bridging unit, and $R_1$ can be $CH_2$, $(CH_2)_2$, $(CH_2)_3$, $(CH_2)_4$, or $(CH_2)_5$; and $R_2$ can be $CH_3$, $C_2H_5$, or $C_3H_7$. The polyimidesiloxane preferably has a molecular weight of about 5,000 to 1,000,000.

The polyimidesiloxane is preferably a compound which results after having part of its aromatic hydrocarbon component substituted by siloxane, and has a 3–25 weight % of Si with respect to polyimide. An example of a polyimide polymer that satisfies these requirements may include Yupicoat FS-100L™ and Yupifine FP-100™, both available from Ube Industries.

Still further, the polyimide polymer, besides above, may include compounds which have a structure as represented by the following Formula H:

[Formula G]

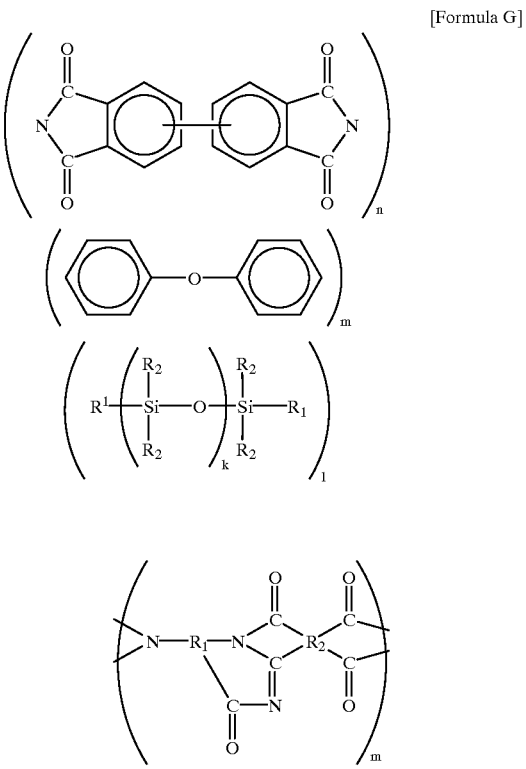

where m represents a positive integer. An example of such a polyimide polymer is a coating type polyimide PIQ6400™ available from Hitachi Chemical. The polyimide polymer of Formula H preferably has a molecular weight of about 5,000 to 500,000.

In an embodiment, the printing device of this invention has at least the periphery of the nozzle orifice made of a polyimide polymer in which a fluorine polymer is dispersed. This arrangement ensures liquid-repellency around the periphery of nozzle orifice. In addition, because the polyimide polymer can be appropriately processed by abrasion with excimer laser, the printing device of this invention allows the nozzle to be formed by abrasion with an excimer laser.

As previously mentioned, for the printing device of this invention, other parts than the nozzle member of the printer head, namely, the parts excluding the periphery of the nozzle orifice which is made of a polyimide polymer with a dispersion of a fluorine polymer, are made of a second polyimide polymer with a dispersion of a fluorine polymer. Because these substances are highly resistant to heating, the periphery of the nozzle opening can be made of a material which polymerizes at a considerably high temperature of about 300° C. Because such materials are necessarily suitable for abrasion with excimer laser, the printing device of this invention will thus allow the nozzle of the printing head to be processed by abrasion with excimer laser.

The fluorine polymer and polyimide polymer used for the liquid-repellent membranes may include the compounds as described above. For example, Teflon coating 958-207 by DuPont or a copolymer of tetrafluoroethylene and hexafluoropropylene can be used as a polyimide polymer with a fluorine polymer dispersed within.

The method to apply Teflon coating 958-207 by DuPont onto the base plate may include coating by spraying, coating by dipping, and a procedure wherein a coat of 10–30 $\mu$m thickness is formed on the plate, and the assembly is dried at about 150° C., and baked at 300° C. or higher (for example 340° C.). As a result, a liquid-repellent membrane with a liquid-repellency appropriate for the printer head is formed. Moreover, because a different polyimide polymer from the one used for the formation of the liquid-repellent membrane is used as a material for the orifice plate, a baking process requiring heating exceeding 300° C. or higher can be applied to the orifice plate, which would be impossible if the orifice plate were made of polysulfone or polyethersulfone.

By way of example, and not limitation, experimental results conducted for the present invention will be set forth.

To check the effects of the polyimide described above, the following experiments were performed. A coat appropriate for the printing device of this invention was prepared. The coat consisted of Teflon coating 958-207 available from DuPont or a polyimide polymer in which a copolymer resin of tetrafluoroethylene and hexafluoropropylene had been dispersed. A second coat was prepared which consisted of Teflon coating 954-101 available from DuPont or an epoxy polymer in which a copolymer resin of tetrafluoroethylene and hexafluoropropylene had been dispersed. The two coats were subjected to abrasion with an excimer laser, and their amenability to laser processing and liquid-repellency were evaluated.

First, test samples were prepared. Teflon coating 958-207 available from DuPont was spread to a coat of 10–15 $\mu$m thickness, which was then dried at 150° C., and baked at 340° C. to produce a sample coat #1. As a comparison, Teflon coating 958-207 by DuPont was spread to a coat of 10–15 $\mu$m thickness, which was then dried at 150° C. to produce a sample coat #2. As a further comparison, Teflon coating 954-101 by DuPont was spread to a coat of 10–15 $\mu$m, which was then dried at 240–250° C. to produce a sample coat #3.

Abrasion with an excimer laser was applied to these samples, and their amenability to abrasion with excimer laser and liquid-repellency were evaluated. The amenability to abrasion was evaluated as follows. Two holes were bored through the thickness of the coat by abrasion with an excimer laser: one had an axis parallel to the thickness of the coat, and the other has an axis oblique to the same thickness. The shape of the hole and presence of minor flaws were checked. The liquid-repellency was evaluated by a test wherein liquid-repellency was measured in terms of surface tension with a wettability indicating agent.

The experiment showed that sample coat #1 is excellent in amenability to laser abrasion, which was substantiated from the observation of the shape of the two holes one straight and the other oblique to the thickness of the coat. In addition, the sample coat #1 gave a surface tension of about 31 dyn/cm, which is sufficiently liquid-repellent to be incorporated into a printing device.

By contrast, sample coat #3, though excellent in amenability to laser abrasion, gave a surface tension less than 31 dyn/cm, and its liquid-repellency was found to be inadequate to be incorporated into a printing device. Similarly, sample coat #2 sometimes developed minor flaws when subjected to abrasion with excimer laser, and thus is more or less inferior in amenability to laser abrasion. It gave a surface tension less than 31 dyn/cm, which was found to be inadequate to be incorporated into a printing device.

From the above test results, it was demonstrated that when a liquid-repellent membrane composed of a polyimide polymer with a fluorine polymer dispersed within is applied at the periphery of nozzle opening, it ensures liquid-repellency of the periphery of nozzle opening. Such arrangement further allows the nozzle to be processed easily by abrasion with an excimer laser. It was further observed that a polyimide polymer with a fluorine polymer dispersed within presents with liquid-repellency and amenability to abrasion with excimer laser only after it has turned into an imide compound.

As is obvious from the above description, the printing device of this invention has at least the periphery of the nozzle orifices on the side of the printer head upon which the nozzles open their mouths coated with liquid-repellent polybenzimidazole. This ensures thereby liquid-repellency of the periphery of the nozzle orifices, and thus allow high-quality printing of documentary images.

For the production of the printing device of this invention, processing by abrasion with excimer laser can be applied because polybenzimidazole or the material to be used for nozzles is well adapted for processing by abrasion with excimer laser. Accordingly, the printing device of this invention allows simplified processing of nozzles, which contributes to improved productivity.

Still further, for the printing device of this invention, other parts than the nozzle member of the printer head, namely, the parts excluding the periphery of the nozzle orifices on the surface where the nozzles open their mouths, are made of polybenzimidazole or polyimide. Because these substances are highly resistant to heating, the periphery of the nozzle orifices can be made of a material that polymerizes at a considerably high temperature of about 150° C. or higher. Because such materials are necessarily suitable for processing by abrasion with excimer laser, the printing device of this invention will allow the nozzles of the printing head to be processed by abrasion with excimer laser. This will help simplify necessary processes and improve productivity.

When the other parts are made of polybenzimidazole, which is well adapted for processing by pressure molding and injection molding, the nozzles can be formed by a method including those procedures. This will lead to a lowering of production cost and improved productivity.

Lastly, as detailed previously, for the printing device of this invention, at least the periphery of nozzle orifices and the nozzle member on the side of the printer head upon which the nozzles open their mouths can be made of polybenzimidazole. When such construction is used, it will be possible to employ a polybenzimidazole material having a considerably high polymerization temperature of about 300° C. as a material for the periphery of nozzle orifices.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A printing device including a printing head comprising:
an ejecting medium chamber;
a first nozzle member including a first nozzle body terminating in a first nozzle orifice, said first nozzle member in fluid communication with said ejecting medium chamber to supply ejecting medium from said ejecting medium chamber to said first nozzle orifice for ejecting the ejecting medium therefrom;
wherein at least a substantial portion of the exterior surface of the first nozzle orifice is made of polybenzimidazole,
and wherein the polybenzimidazole has a structure as represented by the following Formula A:

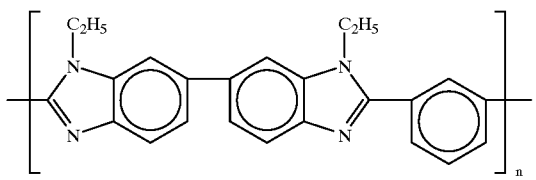

where n represents a positive integer.

2. A printing device including a printing head comprising:
an ejecting medium chamber;
a first nozzle member including a first nozzle body terminating in a first nozzle orifice, said first nozzle member in fluid communication with said ejecting medium chamber to supply ejecting medium from said ejecting medium chamber to said first nozzle orifice for ejecting the ejecting medium therefrom;
and wherein at least a substantial portion of the exterior surface of the first nozzle orifice is made of polybenzimidazole;
and wherein a substantial portion of the exterior surface of the first nozzle body is made of polybenzimidazole, and wherein said polybenzimidazole of said exterior surface of said first nozzle body has a structure as represented by the following Formula B:

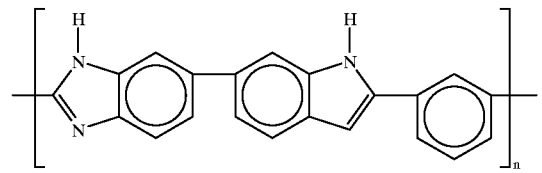

where n represents a positive integer.

3. A printing device including a printer head comprising:
an ejecting medium chamber;
a first nozzle member comprising a first nozzle orifice and a first nozzle body, the first nozzle member in fluid communication with the ejecting medium chamber;
wherein at least a substantial portion of the exterior surface of the first nozzle orifice is made of a first polybenzimidazole material, and at least a substantial portion of the exterior surface of the first nozzle body is made of a second polybenzimidazole material, the second polybenzimidazole material being different from the first polybenzimidazole material.

4. The printing device according to said claim 3, wherein the first polybenzimidazole has a structure as represented by the following Formula A and the second polybenzimidazole has a structure as represented by the following Formula B:

[Formula A]

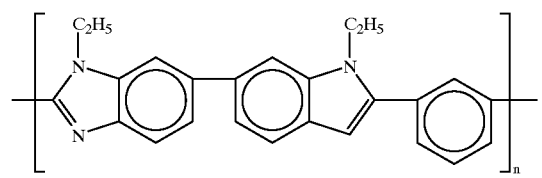

[Formula B]

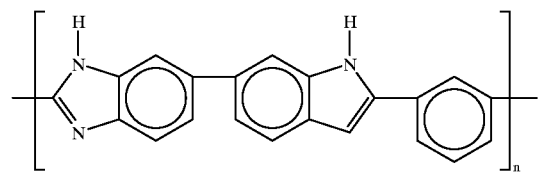

where n represents a positive integer.

* * * * *